US009462561B2

(12) United States Patent
Masuda et al.

(10) Patent No.: US 9,462,561 B2
(45) Date of Patent: Oct. 4, 2016

(54) WIRELESS COMMUNICATION METHOD AND WIRELESS COMMUNICATION APPARATUS

(71) Applicant: FUJITSU LIMITED, Kawasaki-shi (JP)

(72) Inventors: Noboru Masuda, Sagamihara (JP); Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 154 days.

(21) Appl. No.: 14/454,202

(22) Filed: Aug. 7, 2014

(65) Prior Publication Data

US 2015/0043485 A1    Feb. 12, 2015

(30) Foreign Application Priority Data

Aug. 8, 2013  (JP) ................... 2013-165539

(51) Int. Cl.
| | |
|---|---|
| *H04W 24/10* | (2009.01) |
| *H04W 74/08* | (2009.01) |
| *H04W 52/34* | (2009.01) |
| H04B 7/00 | (2006.01) |

(52) U.S. Cl.
CPC ................... *H04W 52/346* (2013.01)

(58) Field of Classification Search
CPC ............. H04W 52/367; H04W 52/34; H04W 72/0406; H04W 72/0453; H04W 52/346; H04W 72/10; H04W 52/06; H04W 52/54; H04W 52/04; H04W 52/18; H04L 5/001
USPC ............... 370/329, 311; 455/522, 450, 452.1
See application file for complete search history.

(56) References Cited

U.S. PATENT DOCUMENTS

| | | | | |
|---|---|---|---|---|
| 2006/0198293 A1* | 9/2006 | Nishio | ................... | H04L 1/0026 370/208 |
| 2006/0211439 A1* | 9/2006 | Mizuguchi | ............ | H04W 52/42 455/522 |
| 2012/0295610 A1* | 11/2012 | Deng | ..................... | H04W 24/10 455/423 |
| 2013/0021979 A1* | 1/2013 | Kwon | ............... | H04W 56/0045 370/328 |
| 2013/0100842 A1* | 4/2013 | Nishikawa | .......... | H04W 52/146 370/252 |

FOREIGN PATENT DOCUMENTS

JP         2012-5078 A    1/2012

* cited by examiner

*Primary Examiner* — Charles C Jiang
*Assistant Examiner* — Will Lin
(74) *Attorney, Agent, or Firm* — Arent Fox LLP

(57) ABSTRACT

A wireless communication method for transmitting a plurality of wireless signals using a plurality of carriers from a first wireless communication apparatus to a second wireless communication apparatus, each of the plurality of carriers having each of a plurality of bandwidths, the wireless communication method including: determining a carrier group including at least two of the plurality of carrier, receiving group power control information for controlling a transmission power of the carrier group, the group power control information being generated in accordance with a reception quality of the carrier group, the reception quality of the carrier group being obtained in accordance with at least one of the plurality of wireless signals that has a carrier included in the carrier group, and transmitting the plurality of wireless signals in accordance with the group power control information.

10 Claims, 20 Drawing Sheets

FIG. 11

| MOBILE DEVICE ID | TPC INFORMATION SAVING MODE APPLICATION INFORMATION (1: APPLIED) | CC ID | REFERENCE CC FLAG (1: REFERENCE CC) | GROUP ID | CLOSED-LOOP TRANSMISSION POWER ACCUMULATION RESULT [dB] | WIRELESS-COMMUNICATION-QUALITY DETERMINATION RESULT (1: QUALITY OK) |
|---|---|---|---|---|---|---|
| MOBILE DEVICE 1 | 1 | CC 1 | 1 | MOBILE DEVICE 1 - CC GROUP 1 | a 1 - 1 | 1 |
| MOBILE DEVICE 1 | 1 | CC 2 | 0 | MOBILE DEVICE 1 - CC GROUP 1 | a 1 - 2 | 1 |
| MOBILE DEVICE 1 | 1 | CC 3 | 0 | NOT GROUPED | — | 0 |
| MOBILE DEVICE 2 | 1 | CC 4 | 1 | MOBILE DEVICE 2 - CC GROUP 1 | a 2 - 4 | 1 |
| MOBILE DEVICE 2 | 1 | CC 5 | 0 | MOBILE DEVICE 2 - CC GROUP 1 | a 2 - 5 | 1 |
| MOBILE DEVICE 2 | 1 | CC 6 | 0 | MOBILE DEVICE 2 - CC GROUP 1 | a 2 - 6 | 1 |
| MOBILE DEVICE 2 | 1 | CC 7 | 0 | MOBILE DEVICE 2 - CC GROUP 1 | a 2 - 7 | 0 |
| MOBILE DEVICE 2 | 1 | CC 8 | 0 | NOT GROUPED | — | 0 |
| MOBILE DEVICE 1 | 1 | CC 9 | 1 | MOBILE DEVICE 1 - CC GROUP 2 | a 1 - 9 | 1 |
| MOBILE DEVICE 1 | 1 | CC 10 | 0 | MOBILE DEVICE 1 - CC GROUP 2 | a 1 - 10 | 1 |

| MOBILE DEVICE ID | TPC INFORMATION SAVING MODE APPLICATION INFORMATION (1: APPLIED) | CC ID | REFERENCE CC FLAG (1: REFERENCE CC) | GROUP ID | CLOSED-LOOP TRANSMISSION POWER ACCUMULATION RESULT [dB] | WIRELESS-COMMUNICATION-QUALITY DETERMINATION RESULT (1: QUALITY OK) |
|---|---|---|---|---|---|---|
| MOBILE DEVICE 1 | 1 | CC1 | 1 | MOBILE DEVICE 1 - CC GROUP 1 | a1-1 | 1 |
| MOBILE DEVICE 1 | 1 | CC2 | 0 | MOBILE DEVICE 1 - CC GROUP 1 | a1-2 | 1 |
| MOBILE DEVICE 1 | 1 | CC3 | 0 | NOT GROUPED | - | 0 |
| MOBILE DEVICE 2 | 1 | CC4 | 1 | MOBILE DEVICE 2 - CC GROUP 1 | a2-4 | 1 |
| MOBILE DEVICE 2 | 1 | CC5 | 0 | MOBILE DEVICE 2 - CC GROUP 1 | a2-5 | 1 |
| MOBILE DEVICE 2 | 1 | CC6 | 0 | MOBILE DEVICE 2 - CC GROUP 1 | a2-6 | 1 |
| MOBILE DEVICE 2 | 1 | CC7 | 0 | MOBILE DEVICE 2 - CC GROUP 1 | a2-7 | 0 |
| MOBILE DEVICE 2 | 1 | CC8 | 0 | NOT GROUPED | - | 0 |
| MOBILE DEVICE 1 | 1 | CC9 | 1 | MOBILE DEVICE 1 - CC GROUP 2 | a1-9 | 1 |
| MOBILE DEVICE 1 | 1 | CC10 | 0 | MOBILE DEVICE 1 - CC GROUP 2 | a1-10 | 1 |

WIRELESS COMMUNICATION METHOD AND WIRELESS COMMUNICATION APPARATUS

CROSS-REFERENCE TO RELATED APPLICATION

This application is based upon and claims the benefit of priority of the prior Japanese Patent Application No. 2013-165539, filed on Aug. 8, 2013, the entire contents of which are incorporated herein by reference.

FIELD

The embodiment discussed herein is related to a wireless communication method, a wireless communication system, and a wireless communication apparatus.

BACKGROUND

Hitherto, in wireless communication, a technology for controlling transmission power of a plurality of component carriers (each of component carriers, which may be referred to as "carrier", having each of bandwidth) by using a common transmission power control (TPC) command in uplink communication from a mobile terminal device to a wireless base station apparatus is known (for example, see Japanese Laid-open Patent Publication No. 2012-005078).

SUMMARY

According to an aspect of the invention, a wireless communication method for transmitting a plurality of wireless signals using a plurality of carriers from a first wireless communication apparatus to a second wireless communication apparatus, each of the plurality of carriers having each of a plurality of bandwidths, the wireless communication method includes: determining a carrier group including at least two of the plurality of carrier, receiving group power control information for controlling a transmission power of the carrier group, the group power control information being generated in accordance with a reception quality of the carrier group, the reception quality of the carrier group being obtained in accordance with at least one of the plurality of wireless signals that has a carrier included in the carrier group, and transmitting the plurality of wireless signals in accordance with the group power control information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 illustrates an example of a ULCC grouping table stored in a base station;

FIG. 12 illustrates an example of a DLCC grouping table stored in a base station;

DESCRIPTION OF EMBODIMENT

A wireless communication method, a wireless communication system, and a communication apparatus according to an embodiment will be described below in detail with reference to the accompanying drawings.

In the above-described related art, if a common TPC command is used for a plurality of component carriers which do not have similar channel characteristics, the quality of wireless communication may deteriorate.

In one aspect, it is an object of a disclosed embodiment to suppress deterioration of the quality of wireless communication while reducing the control overhead by using a common TPC command for a plurality of component carriers having similar channel characteristics.

(Example of Functional Configuration of Wireless Communication System)

Figure 1:
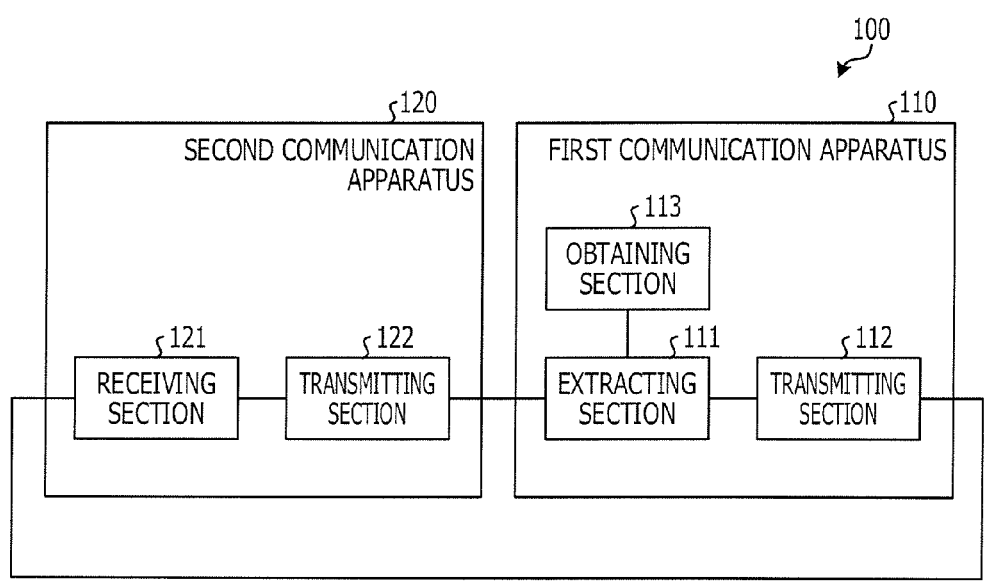
FIG. 1 illustrates an example of the functional configuration of a wireless communication system.

FIG. 1 illustrates an example of the functional configuration of a wireless communication system 100. The wireless communication system 100 includes, as illustrated in FIG. 1, a first communication apparatus 110 and a second communication apparatus 120 which perform wireless communication by using a plurality of component carriers, which may be across multiple frequency bands, simultaneously. The first communication apparatus 110 includes an extracting section 111, a transmitting section 112, and an obtaining section 113. The second communication apparatus 120 includes a receiving section 121 and a transmitting section 122.

The extracting section 111 extracts two or more component carriers included in a predetermined frequency bandwidth (namely certain frequency range) from among a plurality of carrier frequencies. The component carrier has a predefined channel width (a bandwidth). The predetermined frequency bandwidth is a frequency bandwidth in which at least two or more contiguous or near component carriers are included, but not all component carriers are necessarily included. Concerning contiguous or near frequency bands, channel characteristics, such as attenuation and fading characteristics, are similar to each other. In other words, the extracting section 111 extracts two or more component carriers having similar channel characteristics. Extracting of frequency bands includes grouping of frequency bands together. That is, the extracting section 111 groups together two or more component carriers having similar channel characteristics.

The transmitting section 112 transmits common control information concerning transmission power of individual wireless signals of two or more component carriers to the second communication apparatus 120. This common control information is obtained as a result of measuring the quality of a wireless signal received from the second communication apparatus 120 by using any of the component carriers extracted by the extracting section 111. The result of measuring the quality of a wireless signal may be obtained from a wireless signal concerning any of the two or more component carriers extracted by the extracting section 111. For example, one of the two or more component carriers extracted by the extracting section 111 may be used, or the average of any plurality of the two or more component carriers may be used. This is because, if two or more component carriers have similar channel characteristics, the results of measuring wireless signals of such component carriers received from the second communication apparatus 120 are also likely to be similar.

If the qualities of wireless signals received from the second communication apparatus 120 concerning all of the two or more component carriers extracted by the extracting section 111 are measured, a change in the quality of wireless signals of such component carriers may be obtained, thereby enhancing the precision of measurement results in terms of this point. In two or more component carriers having similar channel characteristics, transmission power is increased and decreased in a similar manner. Accordingly, based on the above-described quality measurement results, the transmitting section 112 transmits common control information concerning transmission power of all wireless signals of two or more component carriers having similar channel characteristics to the second communication apparatus 120.

The control information includes information concerning a positive or negative sign indicating whether transmission power will be increased or decreased, information concerning an amount by which transmission power will be increased or decreased, and information indicating a value itself of transmission power. The common control information and two or more component carriers are transmitted to the second communication apparatus 120 in association with each other. For example, the transmitting section 112 transmits one item of control information concerning n component carriers extracted by the extracting section 111.

The receiving section 121 of the second communication apparatus 120 receives control information transmitted from the first communication apparatus 110. More specifically, the receiving section 121 receives information in which common control information concerning transmission power and two or more component carriers are associated with each other. The transmitting section 122 of the second communication apparatus 120 transmits, to the first communication apparatus 110, wireless signals of the two or more component carriers which are obtained as a result of controlling transmission power of the wireless signals of the two or more component carriers by using the common control information received from the first communication apparatus 110 by the receiving section 121.

In this manner, the transmitting section 112 of the first communication apparatus 110 transmits the common control information to the second communication apparatus 120, thereby causing the second communication apparatus 120 to transmit wireless signals of two or more component carriers obtained as a result of controlling transmission power by using the common control information received from the first communication apparatus 110 by the receiving section 121. In the wireless communication system 100, a transmission power control (TPC) information saving mode is employed in which transmission power may be controlled by using one item of control information for two or more component carriers having similar channel characteristics.

The transmitting section 112 transmits control information concerning transmission power of a wireless signal of each of the component carriers which are not extracted by the extracting section 111 to the second communication apparatus 120. This control information is obtained as a result of measuring the quality of a wireless signal received from the second communication apparatus 120. In other words, concerning each of the component carriers which are not grouped together since they have different channel characteristics, the transmitting section 112 transmits separate items of control information concerning transmission power of the individual wireless signals. The transmitting section 112 transmits, for example, m items of control information for m component carriers which are not extracted by the extracting section 111.

The receiving section 121 of the second communication apparatus 120 receives control information concerning transmission power of a wireless signal of each of the component carriers which are not extracted by the extracting section 111. The transmitting section 122 transmits a wireless signal of a component carrier which is not extracted by the extracting section 111 to the first communication apparatus 110. This wireless signal is obtained as a result of controlling transmission power by using the control information associated with this component carrier received by the receiving section 121.

The extracting section 111 extracts, from among a plurality of component carriers, two or more component carriers which are included in a predetermined frequency bandwidth and in which an accumulated controlled variable of transmission power of each of the two or more component carriers is equal to or smaller than a predetermined amount. If an accumulated controlled variable is equal to or smaller than a predetermined amount, it means that transmission power of such a component carrier is stabilized with only a small change in increase or decrease of the transmission power. That is, the extracting section 111 extracts two or more component carriers having similar channel characteristics and stabilized transmission power with only a small change.

The extracting section 111 also extracts, from among a plurality of component carriers, two or more component carriers which are included in a predetermined frequency bandwidth and in which the qualities of wireless signals of the two or more component carriers received from the second communication apparatus 120 are equal to or higher than a predetermined quality. If the qualities of wireless signals are equal to or higher than a predetermined quality, it means that the qualities of these wireless signals are stabilized. That is, the extracting section 111 extracts two or more component carriers which have similar channel characteristics and in which wireless signals of the two or more component carriers are stabilized. For measuring the quality of a wireless signal, a received signal strength indicator (RSSI), for example, may be used.

The extracting section 111 also extracts two or more frequency bands periodically. If a frequency band is periodically extracted, it means that it is extracted, for example, at regular predetermined intervals. Accordingly, frequency bands to be grouped together may be updated sequentially, and it is possible to continue or cancel the TPC information saving mode.

The extracting section 111 also extracts, from among a plurality of component carriers, two or more frequency bands included in a frequency bandwidth which is set in accordance with a center frequency of at least any one of the plurality of component carriers. For example, when the center frequency of a frequency band is a high frequency, the radio wave transmitted straightly, as the result the power loss of signal caused by reflection is large, thereby increasing the possibility of the occurrence of a leakage. Accordingly, when the center frequency of a frequency band is a high frequency, the signal quality is more likely to deteriorate than that when the center frequency of a component carrier is a low frequency. Thus, the frequency bandwidth is set to be narrower than that when the center frequency of a frequency band is a low frequency.

If the second communication apparatus 120 is a mobile station, the obtaining section 113 obtains information indicating the moving rate of the second communication apparatus 120. The extracting section 111 extracts, from among a plurality of component carriers, two or more component carriers included in a frequency bandwidth which is set in accordance with the moving rate indicated by the information obtained by the obtaining section 113. For example, if the moving rate of the second communication apparatus 120 is higher, the signal quality is likely to deteriorate than that when the moving rate is lower or zero. Accordingly, if the moving rate of the second communication apparatus 120 is higher, the frequency bandwidth is set to be narrower. For example, if the moving rate of the second communication apparatus 120 has reached a threshold, the frequency bandwidth may be decreased.

The obtaining section 113 obtains information indicating the threshold of signal quality, which may include a shielding degree, of radio waves between the first and second communication apparatuses 110 and 120. The extracting section 111 extracts, from among a plurality of frequency bands, two or more component carriers included in a frequency bandwidth which is set in accordance with the threshold of signal quality indicated by the information obtained by the obtaining section 113. If the threshold of signal quality of radio waves is higher, for example, that in a place in which high-rise buildings stand together, the signal quality is likely to deteriorate than that in a place without high-rise buildings.

Accordingly, if the threshold of signal quality of radio waves between the first and second communication apparatuses 110 and 120 is higher, the frequency bandwidth is set to be narrower. The threshold of signal quality may be obtained from position information indicating the second communication apparatus 120 and map data indicating natural and manmade feature information. That is, the obtaining section 113 obtains the threshold of signal quality based on position information concerning the second communication apparatus 120 and map data indicating natural and manmade feature information.

The extracting section 111 may extract two or more component carriers included in a frequency bandwidth which is set in accordance with a signal modulation method. Examples of the signal modulation method are quadrature amplitude modulation (QAM) and quadrature phase shift keying (QPSK). The degree by which the signal quality deteriorates differs depending on the modulation method. Accordingly, the frequency bandwidth may be changed in accordance with the signal modulation method.

(Example of System Configuration of Wireless Communication System)

Figure 2:
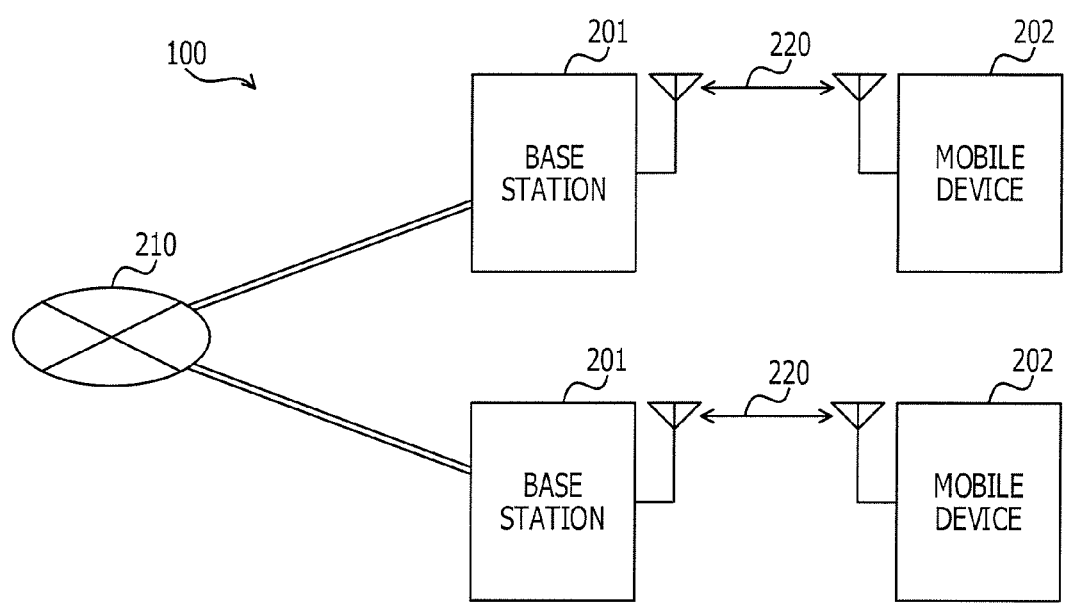
FIG. 2 illustrates an example of the system configuration of the wireless communication system.

FIG. 2 illustrates an example of the system configuration of the wireless communication system 100. The wireless communication system 100 includes, as illustrated in FIG. 2, a plurality of base stations 201 and a plurality of mobile devices 202. The base station 201 is, for example, the first communication apparatus 110 illustrated in FIG. 1, and the mobile device 202 is, for example, the second communication apparatus 120 illustrated in FIG. 1. The base stations 201 are connected to each other via a network 210. The network 210 is, for example, the Internet, a local area network (LAN), or a wide area network (WAN).

A base station 201 is connected to a mobile device 202 via a wireless communication network 220. A base station 201 is connected via the network 210 to a mobile device 202 located within a cell which represents a radio wave coverage. The base station 201 converts data received from the network 210 into a data format that matches a wireless interface and carries the converted data to a mobile device 202 located within the cell of the base station 201 by using a wireless frequency. The base station 201 also receives data from a mobile device 202 carried in a wireless frequency and converts the data into a data format that matches a wired interface, and then carries the converted data to the wireless communication network 220.

The mobile device 202 is, for example, a cellular phone, a smartphone, a tablet computer, or a personal computer (PC). By connecting to the base station 201 via the wireless communication network 220, the mobile device 202 realizes a communication function, and also downloads or uploads various items of data from or to the base station 201.

(Example of Component Carriers Transmitted and Received Between Base Station and Mobile Device)

Figure 3:
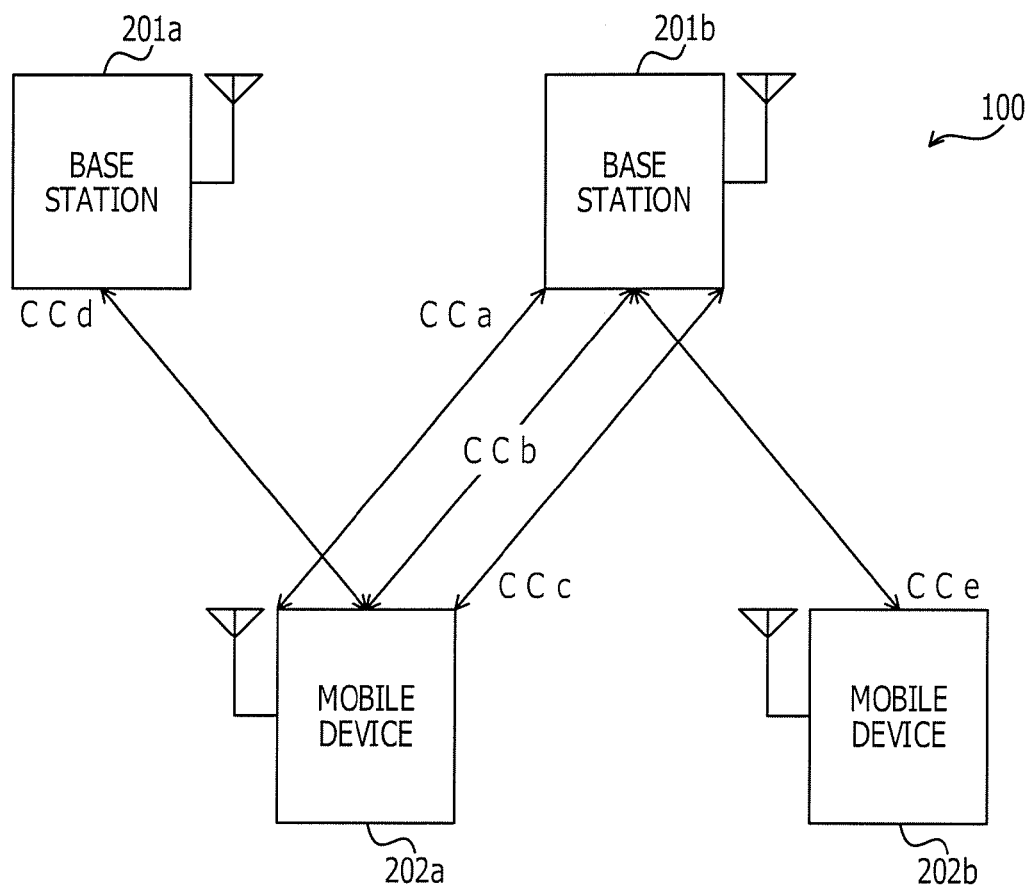
FIG. 3 illustrates examples of component carriers transmitted and received between base stations and mobile devices.

FIG. 3 illustrates examples of component carriers transmitted and received between base stations and mobile devices. As illustrated in FIG. 3, a base station 201a is connected to a mobile device 202a, and a base station 201b is connected to the mobile device 202a and a mobile device 202b.

The maximum rate of wireless data communication is limited by the system bandwidth. For example, the maximum system bandwidth of long term evolution (LTE) is 20 MHz. In order to implement faster data communication than that in LTE, a technology referred to as "carrier aggregation (CA)" is available. In CA, a plurality of LTE carriers called component carriers (CCs) are used at the same time, thereby achieving wideband transmission exceeding 20 MHz. In this specification, component carriers are sometimes referred to as "CCs".

For example, two component carriers which are contiguous on the frequency domain in the same frequency band may be aggregated. A maximum of five component carriers which are non-contiguous on the frequency domain in different frequency bands may be aggregated, thereby implementing a bandwidth at a maximum of 100 MHz.

It is now assumed that, when component carriers are aggregated, fast transmission power control (TPC) is separately performed on each of the component carriers. In TPC, open-loop TPC and closed-loop TPC are both employed for each of uplink communication and downlink communication. In this specification, uplink is sometimes referred to as "UL", and downlink is sometimes referred to as "DL".

Open-loop TPC is a technique for estimating propagation loss based on received power by a reception side (base station 201 or mobile device 202) and for autonomously determining transmission power of the reception side.

Open-loop TPC is employed, for example, when closed-loop TPC is not applicable. Closed-loop TPC is a technique for determining transmission power of a reception side (base station 201 or mobile device 202) by using control information fed back to the reception side as TPC bits on a dedicated physical control channel (DPCCH).

In open-loop TPC, target power is set for component carriers. In closed-loop TPC, in the case of uplink TPC, the base station 201 measures the wireless communication quality concerning component carriers. Based on the measurement results, the base station 201 sends control information concerning transmission power to the mobile device 202 by using a control channel so that transmission power may satisfy the wireless communication quality. Upon receiving the control information, the mobile device 202 controls transmission power based on the control information.

In closed-loop TPC, in the case of downlink TPC, the mobile device 202 measures the downlink wireless communication quality concerning component carriers. Based on the measurement results, the mobile device 202 sends control information concerning transmission power to the base station 201 by using a control channel so that transmission power may satisfy the wireless communication quality. Upon receiving the control information, the base station 201 controls transmission power based on the control information.

Transmission power of signals, such as a physical uplink shared channel (PUSCH) signal, transmitted in uplink communication in an LTE system is controlled by a combination of open-loop TPC and closed-loop TPC. Signals transmitted in uplink communication also include a physical uplink control channel (PUCCH) signal and a sounding reference signal (SRS).

Open-loop TPC is performed by using a parameter (such as a parameter α in equation (1)) which is supplied from the base station 201 at relatively long intervals and by using propagation loss (PL) measured by the mobile device 202. Closed-loop TPC is performed by using a TPC command which is supplied from the base station 201 at relatively short intervals based on a communication status between the base station 201 and the mobile device 202. The communication status is determined based on, for example, a signal to interference plus noise power ratio (SINR) received by the base station 201.

By taking TPC for a PUSCH signal as an example, transmission power of a PUSCH signal in open-loop TPC is calculated by the following equation (1).

$$P\text{PUSCH}(i) = \min\{P\text{CMAX}, 10\log 10(M\text{PUSCH}(i)) + P0\_\text{PUSCH}(j) + \alpha(j) \cdot PL + \Delta TF(i) + f(i)\} \quad (1)$$

In the above-described equation (1), PCMAX is the maximum transmission power, MPUSCH is a transmission bandwidth, P0_PUSCH is a parameter for target reception power, α is a fractional TPC weight coefficient, PL is a measured path loss value, ΔTF is an offset which is dependent on the modulation and coding scheme (MCS), and f(i) is a correction value based on a TPC command.

In closed-loop TPC performed between the base station 201 and the mobile device 202, in the case of uplink TPC, for example, the base station 201 calculates a difference between a target received SINR and a received SINR obtained by averaging an averaging time t. Then, the base station 201 informs the mobile device 202 of this difference as a TPC command, thereby controlling transmission power of the mobile device 202.

With this configuration, when component carriers are aggregated, if TPC is performed on each of the component carriers, the number of TPC messages is increased by a factor of n in proportion to the number (n) of component carriers, thereby increasing the load imposed on a control channel.

Transmission power in downlink TPC in an LTE system is calculated by, for example, the following equation (2).

$$P(k) = P(K-1) + P\text{TPC}(k) + P\text{bal}(k) \quad (2)$$

In the above-described equation (2), P(k) is downlink transmission power when TPC is performed for the k-th time, P(K−1) is transmission power when TPC is performed for the (k−1)-th time, Pbal(k) is an adjustment value in consideration of the downlink transmission power balance, and PTPC(k) is a change in transmission power in the k-th TPC, which is controlled by a mobile device by using an uplink DPCCH TPC field.

With this configuration, as in uplink communication, when component carriers are aggregated, the amount of information for performing TPC is increased in proportion to the number of component carriers, thereby increasing the load imposed on a control channel.

Hence, in this embodiment, TPC is performed for a plurality of grouped component carriers having similar channel characteristics by using one item of control information. It is thus possible to suppress deterioration of the quality of a wireless signal while reducing the amount of information for performing TPC.

As illustrated in FIG. 3, component carriers having different frequencies CCa, CCb, CCc, CCd, and CCe are used between the base stations 201a and 201b and the mobile devices 202a and 202b. More specifically, the component carrier CCd is used between the base station 201a and the mobile device 202a. The component carriers CCa, CCb, and CCc are used between the base station 201b and the mobile device 202a. The component carrier CCe is used between the base station 201b and the mobile device 202b.

(Example of Correlation of Ccs on Frequency Domain)

Figure 4:
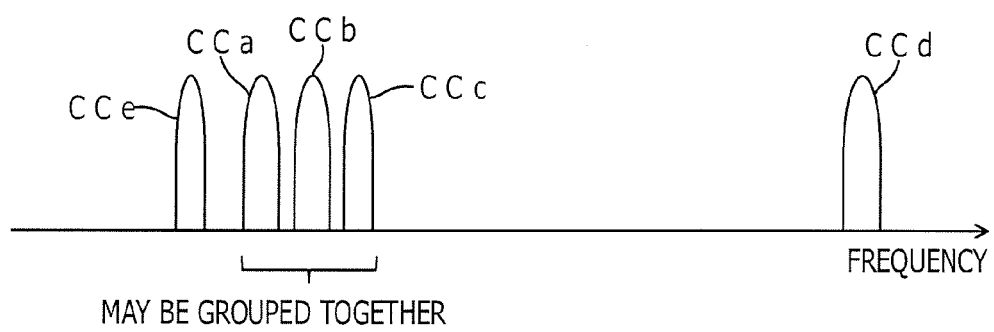
FIG. 4 illustrates an example of the correlation among component carriers on a frequency domain.

FIG. 4 illustrates an example of the correlation among component carriers on a frequency domain. As illustrated in FIG. 4, the component carriers CCa, CCb, CCc, CCd, and CCe are indicated on the frequency domain. The component carriers CCa, CCb, CCc, and CCe are all included in a predetermined frequency bandwidth around a reference frequency (for example, the center frequency of the component carrier CCb). The component carrier CCd is not included in the predetermined frequency bandwidth around the reference frequency.

Although the component carrier CCe is included in the predetermined frequency bandwidth around the reference frequency, it is used by a mobile device 202 different from the mobile device 202 using the other component carriers CCa, CCb, and CCc. Accordingly, in closed-loop TPC, the three component carriers CCa, CCb, and CCc are grouped together, and then, transmission power of this CC group is controlled by using one item of TPC information in the TPC information saving mode. Thus, concerning the three component carriers CCa, CCb, and CCc, in uplink or downlink communication, it is possible to reduce the amount of information to perform TPC to one third without impairing the quality of wireless communication.

(Example of Hardware Configuration of Base Station)

Figure 5:
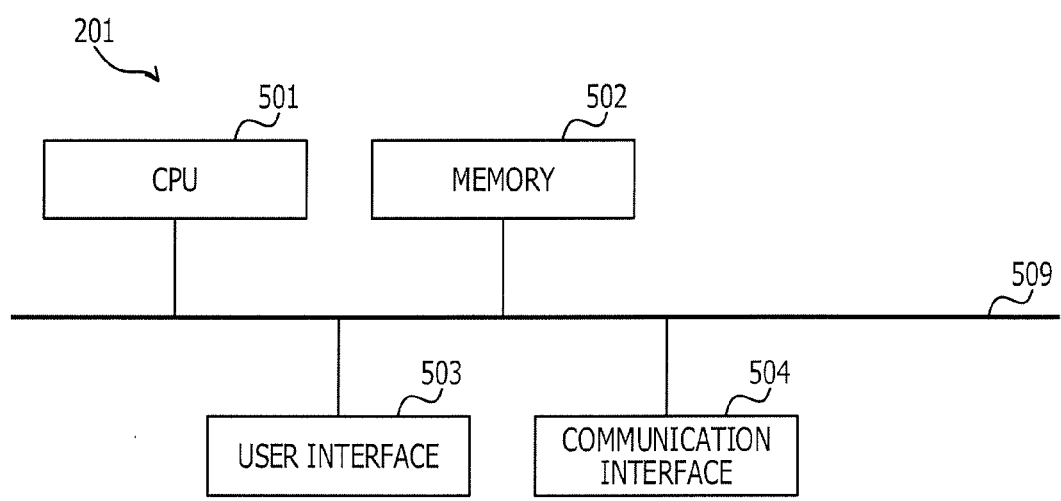
FIG. 5 illustrates an example of the hardware configuration of a base station.

FIG. 5 illustrates an example of the hardware configuration of the base station 201. The base station 201 includes, as illustrated in FIG. 5, a central processing unit (CPU) 501, a memory 502, a user interface 503, and a communication interface 504. The CPU 501, the memory 502, the user interface 503, and the communication interface 504 are connected to each other via a bus 509.

The CPU 501 controls the entire base station 201. The memory 502 includes, for example, a main memory and an auxiliary memory. The main memory is, for example, a random access memory (RAM). The main memory is used as a work area for the CPU 501.

The auxiliary memory is a non-volatile memory, such as a magnetic disk, an optical disc, or a flash memory. In the auxiliary memory, various programs for operating the base station 201 are stored. The programs stored in the auxiliary memory are loaded to the main memory and are executed by the CPU 501.

The user interface 503 includes, for example, an input device that receives input of an operation performed by a user and an output device that outputs information to a user. The input device may be implemented by a touch panel, keys (for example, a keyboard), a microphone, or a remote controller. The output device may be implemented by a touch panel, a display, or a speaker. The user interface 503 is controlled by the CPU 501.

The communication interface 504 is, for example, an interface that performs communication with an external device disposed outside the base station 201 via a wired or wireless medium. The communication interface 504 is controlled by the CPU 501.

The extracting section 111, the transmitting section 112, and the obtaining section 113 of the first communication apparatus 110 discussed with reference to FIG. 1 are implemented by the CPU 501. That is, the functions of these elements are implemented as a result of the CPU 501 executing the corresponding programs.

(Example of Hardware Configuration of Mobile Device)

Figure 6:
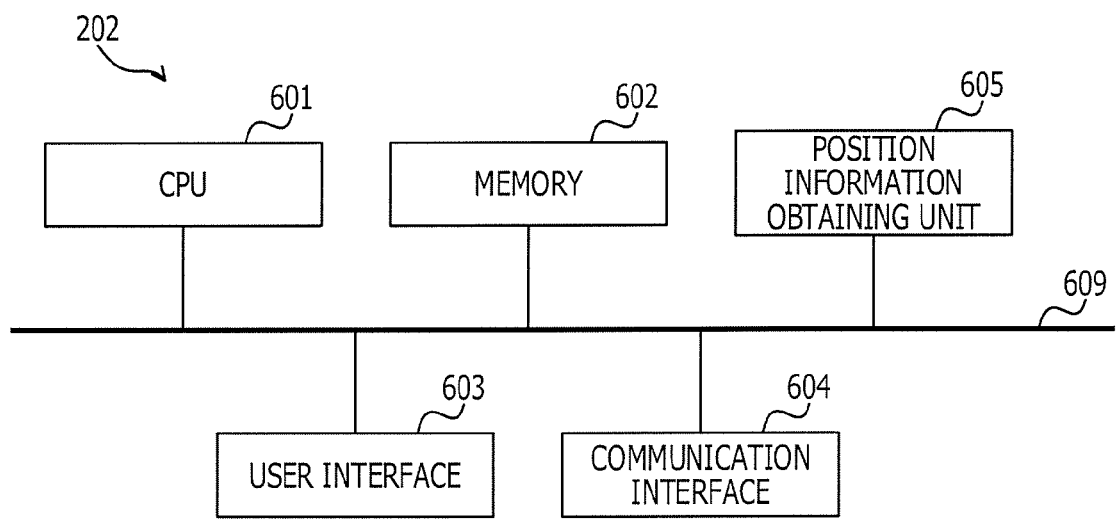
FIG. 6 illustrates an example of the hardware configuration of a mobile device.

FIG. 6 illustrates an example of the hardware configuration of the mobile device 202. The mobile device 202 includes, as illustrated in FIG. 6, a CPU 601, a memory 602, a user interface 603, a communication interface 604, and a position information obtaining unit 605. The CPU 601, the memory 602, the user interface 603, the communication interface 604, and the position information obtaining unit 605 are connected to each other via a bus 609.

The CPU 601 controls the entire mobile device 202. The memory 602 includes, for example, a main memory and an auxiliary memory. The main memory is, for example, a RAM. The main memory is used as a work area for the CPU 601.

The auxiliary memory is a non-volatile memory, such as a magnetic disk, an optical disc, or a flash memory. In the auxiliary memory, various programs for operating the mobile device 202 are stored. The programs stored in the auxiliary memory are loaded to the main memory and are executed by the CPU 601.

The user interface 603 includes, for example, an input device that receives input of an operation performed by a user and an output device that outputs information to a user. The input device may be implemented by a touch panel, keys (for example, a keyboard), a microphone, or a remote controller. The output device may be implemented by a touch panel, a display, or a speaker. The user interface 603 is controlled by the CPU 601.

The communication interface 604 is, for example, an interface that performs communication with an external device disposed outside the mobile device 202 via a wired or wireless medium. The communication interface 604 is controlled by the CPU 601. The position information obtaining unit 605 obtains position information concerning the mobile device 202. As the position information obtaining unit 605, a device that obtains position information based on global positioning system (GPS) information output from a GPS satellite may be used.

The receiving section 121 and the transmitting section 122 of the second communication apparatus 120 discussed with reference to FIG. 1 are implemented by the CPU 601. That is, the functions of these elements are implemented as a result of the CPU 601 executing the corresponding programs.

(Example of Detailed Functional Configuration of Base Station)

Figure 7:
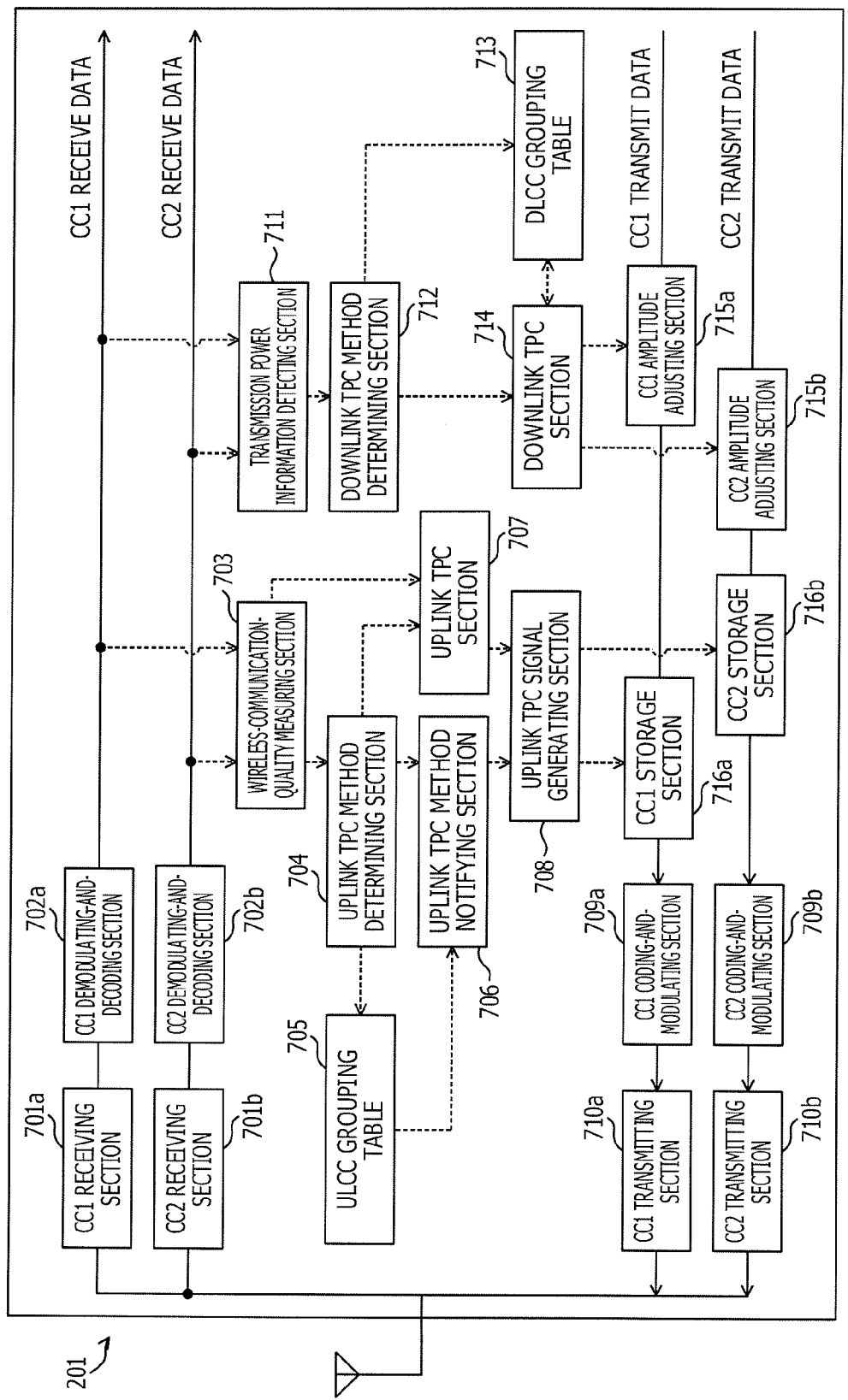
FIG. 7 illustrates an example of the detailed functional configuration of a base station.

FIG. 7 illustrates an example of the detailed functional configuration of the base station 201. A description will be given, with reference to FIG. 7, of a case in which two component carriers CC1 and CC2 are used.

The base station 201 includes, as illustrated in FIG. 7, a CC1 receiving section 701a, a CC2 receiving section 701b, a CC1 demodulating-and-decoding section 702a, a CC2 demodulating-and-decoding section 702b, a wireless-communication-quality measuring section 703, and an uplink TPC method determining section 704. The base station 201 also includes an uplink component carrier (ULCC) grouping table 705, an uplink TPC method notifying section 706, an uplink TPC section 707, and an uplink TPC signal generating section 708.

The base station 201 also includes a CC1 coding-and-modulating section 709a, a CC2 coding-and-modulating section 709b, a CC1 transmitting section 710a, a CC2 transmitting section 710b, a transmission power information detecting section 711, and a downlink TPC method determining section 712. The base station 201 also includes a downlink component carrier (DLCC) grouping table 713, a downlink TPC section 714, a CC1 amplitude adjusting section 715a, a CC2 amplitude adjusting section 715b, a CC1 storage section 716a, and a CC2 storage section 716b.

The above-described elements except for the ULCC grouping table 705 and the DLCC grouping table 713 are implemented by the CPU 501 illustrated in FIG. 5. That is, the functions of these elements of the base station 201 are implemented as a result of the CPU 501 executing the corresponding programs. The ULCC grouping table 705 and the DLCC grouping table 713 are implemented by the memory 502.

The CC1 receiving section 701a receives a signal using the component carrier CC1. The CC1 receiving section 701a outputs the received signal using the component carrier CC1 to the CC1 demodulating-and-decoding section 702a. The CC2 receiving section 701b receives a signal using the component carrier CC2. The CC2 receiving section 701b outputs the received signal using the component carrier CC2 to the CC2 demodulating-and-decoding section 702b.

The CC1 demodulating-and-decoding section 702a demodulates and decodes the signal using the component carrier CC1 received from the CC1 receiving section 701a. The CC1 demodulating-and-decoding section 702a outputs the demodulated and decoded signal to the wireless-communication-quality measuring section 703 and the transmission power information detecting section 711.

The CC2 demodulating-and-decoding section 702b demodulates and decodes the signal using the component carrier CC2 received from the CC2 receiving section 701b. The CC2 demodulating-and-decoding section 702b outputs the demodulated and decoded signal to the wireless-communication-quality measuring section 703 and the transmission power information detecting section 711.

The wireless-communication-quality measuring section 703 measures the uplink wireless communication quality concerning each of the component carriers CC1 and CC2. The wireless-communication-quality measuring section 703 outputs measurement results of the uplink wireless communication qualities to the uplink TPC method determining section 704 and the uplink TPC section 707.

The uplink TPC method determining section 704 determines whether to start or stop the uplink TPC information saving mode to control uplink transmission power, based on a known control method and the measurement results obtained by the wireless-communication-quality measuring section 703. The uplink TPC information saving mode is a mode in which component carriers having contiguous frequencies are grouped together, and then, closed-loop TPC is performed by using one item of TPC information for each CC group.

The uplink TPC method determining section 704 also determines an uplink TPC method. The uplink TPC method determining section 704 generates and updates CC grouping information stored in the ULCC grouping table 705. More specifically, if there is a new component carrier contained in a predetermined threshold range based on the measurements results obtained by the wireless-communication-quality measuring section 703, the uplink TPC method determining section 704 updates the ULCC grouping table 705 so as to add this new component carrier to a ULCC group. If there is a component carrier in which the uplink wireless communication quality deviates from the predetermined threshold range (that is, the uplink wireless communication quality is lower than a lower limit value), the uplink TPC method determining section 704 updates the ULCC grouping table 705 so as to delete this component carrier from a ULCC group.

In the ULCC grouping table 705, CC grouping information indicating mobile device IDs, component carrier IDs (CCIDs), and group IDs is stored. The CC grouping information indicates which mobile device 202 belongs to which ULCC group. Details of the ULCC grouping table 705 will be discussed later.

The uplink TPC method notifying section 706 generates information indicating a sign to start or stop the uplink TPC information saving mode, based on a determination result obtained by the uplink TPC method determining section 704, and outputs the generated information to the uplink TPC signal generating section 708. For example, if the ULCC grouping table 705 is updated, the uplink TPC method notifying section 706 generates a ULCC grouping table 705 for each ULCC group by using a predetermined format, and outputs the generated ULCC grouping table 705 to the uplink TPC signal generating section 708.

The uplink TPC section 707 controls uplink transmission power for each ULCC group by using the measurement results obtained by the wireless-communication-quality measuring section 703 and the determination result obtained by the uplink TPC method determining section 704. When the uplink TPC information saving mode is started, the uplink TPC section 707 performs TPC only for one component carrier included in a target ULCC group. The uplink TPC section 707 stops transmitting TPC information concerning the other component carriers included in the same ULCC group. The uplink TPC section 707 then outputs the TPC information for each ULCC group to the uplink TPC signal generating section 708.

The uplink TPC signal generating section 708 generates a control signal based on the information indicating a sign to start or stop the uplink TPC information saving mode concerning the component carrier CC1 output from the uplink TPC method notifying section 706. The uplink TPC signal generating section 708 generates this control signal also based on the TPC information concerning the component carrier CC1 output from the uplink TPC section 707. The uplink TPC signal generating section 708 then outputs the generated control signal concerning the component carrier CC1 to the CC1 storage section 716a.

The uplink TPC signal generating section 708 also generates a control signal based on the information indicating a sign to start or stop the uplink TPC information saving mode concerning the component carrier CC2 output from the uplink TPC method notifying section 706. The uplink TPC signal generating section 708 generates this control signal also based on the TPC information concerning the component carrier CC2 output from the uplink TPC section 707. The uplink TPC signal generating section 708 then outputs the generated control signal concerning the component carrier CC2 to the CC2 storage section 716b.

The CC1 storage section 716a stores the control signal concerning the component carrier CC1 generated by the uplink TPC signal generating section 708 in a transmit-data control channel. The CC2 storage section 716b stores the control signal concerning the component carrier CC2 generated by the uplink TPC signal generating section 708 in the transmit-data control channel.

The CC1 coding-and-modulating section 709a codes and modulates the control signal concerning the component carrier CC1 stored in the transmit-data control channel by the CC1 storage section 716a, and outputs the coded and modulated control signal to the CC1 transmitting section 710a. The CC2 coding-and-modulating section 709b codes and modulates the control signal concerning the component carrier CC2 stored in the transmit-data control channel by the CC2 storage section 716b, and outputs the coded and modulated control signal to the CC2 transmitting section 710b.

The CC1 transmitting section 710a transmits the control signal coded and modulated by the CC1 coding-and-modulating section 709a to the mobile device 202. The CC2 transmitting section 710b transmits the control signal coded and modulated by the CC2 coding-and-modulating section 709b to the mobile device 202.

If it is the base station 201 that makes a determination as to whether to start or stop the downlink TPC information saving mode, the transmission power information detecting section 711 detects a TPC request generated by the mobile device 202. If it is the mobile device 202 that makes a determination as to whether to start or stop the downlink TPC information saving mode, the transmission power information detecting section 711 detects information indicating a sign to start or stop the downlink TPC information saving mode generated by the mobile device 202. If the mobile device 202 updates CC grouping information, the transmission power information detecting section 711 detects update information concerning CC grouping information updated by the mobile device 202. The transmission power information detecting section 711 outputs a detected item of information to the downlink TPC method determining section 712.

If it is the base station 201 that makes a determination as to whether to start or stop the downlink TPC information saving mode, the downlink TPC method determining section 712 accumulates, for a predetermined period, TPC requests concerning each component carrier received from the mobile device 202 and detected by the transmission power information detecting section 711. Then, the downlink TPC method determining section 712 determines whether to start or stop the downlink TPC information saving mode, and outputs a determination result to the downlink TPC section 714. The downlink TPC method determining section 712 also generates and updates CC grouping information stored in the DLCC grouping table 713.

In the DLCC grouping table 713, CC grouping information indicating mobile device IDs, component carrier IDs (CCIDs), and group IDs is stored. The CC grouping information indicates which mobile device 202 belongs to which DLCC group. Details of the DLCC grouping table 713 will be discussed later.

The downlink TPC section 714 maps a sign to start or stop the downlink TPC information saving mode for each DLCC group onto a download control channel, based on a determination result obtained by the downlink TPC method determining section 712. Every time the DLCC grouping table 713 is updated, the downlink TPC section 714 maps a target DLCC grouping table 713 onto the download control channel.

The downlink TPC section 714 outputs a control signal to the CC1 amplitude adjusting section 715*a* and the CC2 amplitude adjusting section 715*b*. The CC1 amplitude adjusting section 715*a* adjusts the amplitude of CC1 data based on the control signal output from the downlink TPC section 714. The CC1 amplitude adjusting section 715*a* then outputs the control signal used for adjusting the amplitude of the CC1 data to the CC1 coding-and-modulating section 709*a*. The CC2 amplitude adjusting section 715*b* adjusts the amplitude of CC2 data based on the control signal output from the downlink TPC section 714. The CC2 amplitude adjusting section 715*b* then outputs the control signal used for adjusting the amplitude of the CC2 data to the CC2 coding-and-modulating section 709*b*.

The CC1 coding-and-modulating section 709*a* codes and modulates information indicating a sign to start or stop the downlink TPC information saving mode concerning the component carrier CC1, based on the control signal output from the CC1 amplitude adjusting section 715*a*, and then outputs the coded and modulated information to the CC1 transmitting section 710*a*. The CC2 coding-and-modulating section 709*b* codes and modulates information indicating a sign to start or stop the downlink TPC information saving mode concerning the component carrier CC2, based on the control signal output from the CC2 amplitude adjusting section 715*b*, and then outputs the coded and modulated information to the CC2 transmitting section 710*b*.

(Example of Detailed Functional Configuration of Mobile Device)

Figure 8:
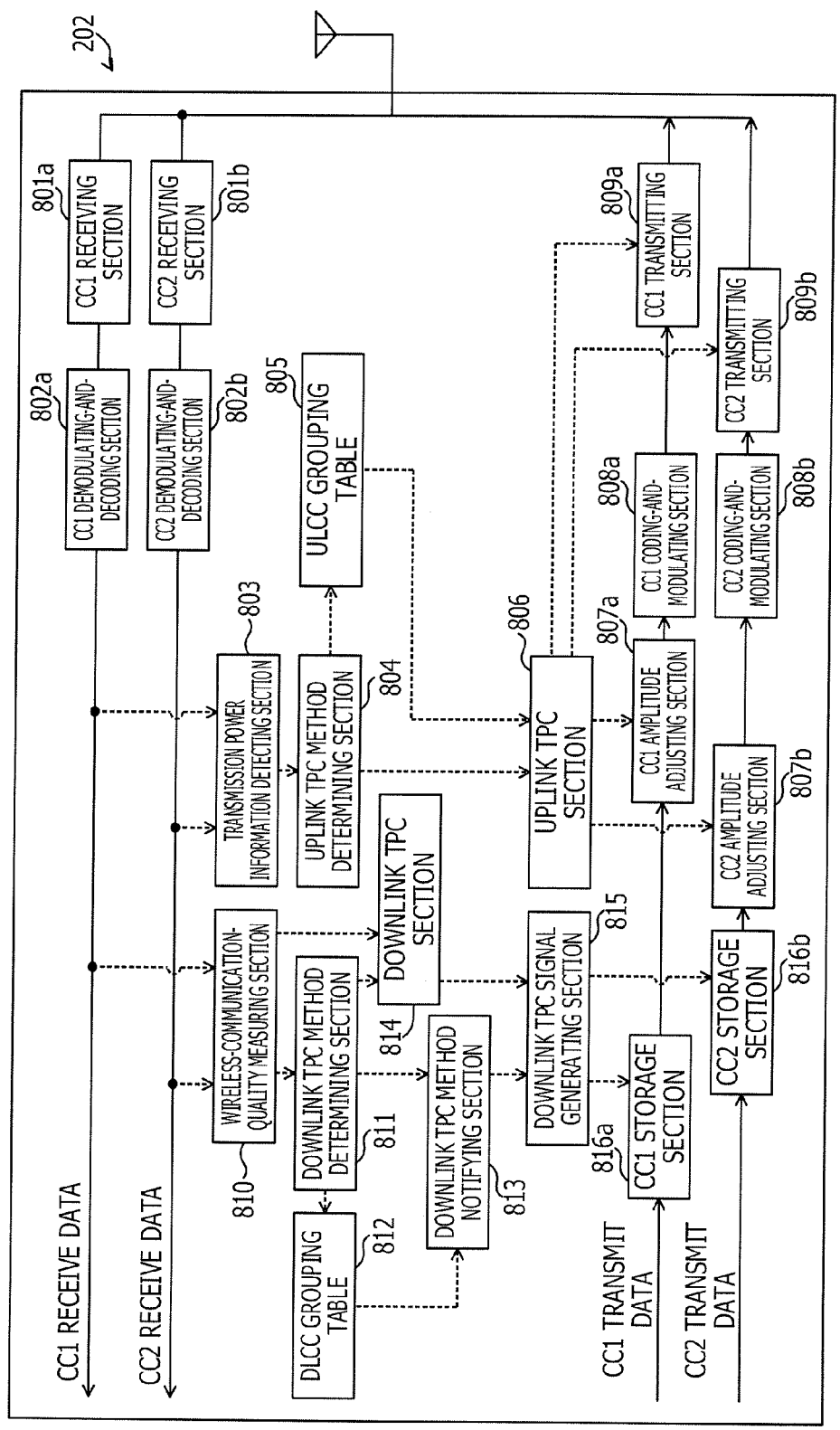
FIG. 8 illustrates an example of the detailed functional configuration of a mobile device.

FIG. 8 illustrates an example of the detailed functional configuration of the mobile device 202. A description will be given, with reference to FIG. 8, of a case in which two component carriers CC1 and CC2 are used.

The mobile device 202 includes, as illustrated in FIG. 8, a CC1 receiving section 801*a*, a CC2 receiving section 801*b*, a CC1 demodulating-and-decoding section 802*a*, a CC2 demodulating-and-decoding section 802*b*, a transmission power information detecting section 803, and an uplink TPC method determining section 804. The mobile device 202 also includes a ULCC grouping table 805, an uplink TPC section 806, a CC1 amplitude adjusting section 807*a*, a CC2 amplitude adjusting section 807*b*, a CC1 coding-and-modulating section 808*a*, a CC2 coding-and-modulating section 808*b*, and a CC1 transmitting section 809*a*.

The mobile device 202 also includes a CC2 transmitting section 809*b*, a wireless-communication-quality measuring section 810, a downlink TPC method determining section 811, a DLCC grouping table 812, a downlink TPC method notifying section 813, and a downlink TPC section 814. The mobile device 202 also includes a downlink TPC signal generating section 815, a CC1 storage section 816*a*, and a CC2 storage section 816*b*.

The above-described elements except for the ULCC grouping table 805 and the DLCC grouping table 812 are implemented by the CPU 601 illustrated in FIG. 6. That is, the functions of these elements of the mobile device 202 are implemented as a result of the CPU 601 executing the corresponding programs. The ULCC grouping table 805 and the DLCC grouping table 812 are implemented by the memory 602.

The CC1 receiving section 801*a* receives a signal using the component carrier CC1. The CC1 receiving section 801*a* outputs the received signal using the component carrier CC1 to the CC1 demodulating-and-decoding section 802*a*. The CC2 receiving section 801*b* receives a signal using the component carrier CC2. The CC2 receiving section 801*b* outputs the received signal using the component carrier CC2 to the CC2 demodulating-and-decoding section 802*b*.

The CC1 demodulating-and-decoding section 802*a* demodulates and decodes the signal using the component carrier CC1 received from the CC1 receiving section 801*a*. The CC1 demodulating-and-decoding section 802*a* outputs the demodulated and decoded signal to the transmission power information detecting section 803 and the wireless-communication-quality measuring section 810.

The CC2 demodulating-and-decoding section 802*b* demodulates and decodes the signal using the component carrier CC2 received from the CC2 receiving section 801*b*. The CC2 demodulating-and-decoding section 802*b* outputs the demodulated and decoded signal to the transmission power information detecting section 803 and the wireless-communication-quality measuring section 810.

The transmission power information detecting section 803 detects CC grouping information and also detects information indicating a sign to start or stop the uplink TPC information saving mode concerning each of the component carriers CC1 and CC2 sent from the base station 201. The transmission power information detecting section 803 then outputs detected items of information to the uplink TPC method determining section 804.

The uplink TPC method determining section 804 determines whether to control uplink transmission power by using the uplink TPC information saving mode, based on information indicating a sign to start or stop the uplink TPC information saving mode output from the transmission power information detecting section 803. That is, the uplink TPC method determining section 804 determines whether to apply one item of TPC information for all component carriers included in the same ULCC group.

In the ULCC grouping table 805, CC grouping information for performing the uplink TPC information saving mode is stored. The ULCC grouping table 805 is generated and updated in response to an instruction from the base station 201. For example, in the ULCC grouping table 805, CC grouping information indicating base station IDs, component carrier IDs (CCIDs), and group IDs is stored.

If the determination result output from the uplink TPC method determining section 804 indicates that the uplink TPC information saving mode will be employed, the uplink TPC section 806 applies one item of TPC information to all component carriers included in the same ULCC group. The uplink TPC section 806 outputs TPC information for each ULCC group to the CC1 amplitude adjusting section 807a and the CC2 amplitude adjusting section 807b. The uplink TPC section 806 also adjusts the gains of amplifiers of the CC1 transmitting section 809a and the CC2 transmitting section 809b.

The CC1 amplitude adjusting section 807a adjusts the amplitude of CC1 data based on a signal output from the uplink TPC section 806. The CC1 amplitude adjusting section 807a then outputs the signal used for adjusting the amplitude of the CC1 data to the CC1 coding-and-modulating section 808a. The CC2 amplitude adjusting section 807b adjusts the amplitude of CC2 data based on a signal output from the uplink TPC section 806. The CC2 amplitude adjusting section 807b then outputs the signal used for adjusting the amplitude of the CC2 data to the CC2 coding-and-modulating section 808b.

The CC1 coding-and-modulating section 808a codes and modulates the signal output from the CC1 amplitude adjusting section 807a, and then outputs the coded and modulated signal to the CC1 transmitting section 809a. The CC2 coding-and-modulating section 808b codes and modulates the signal output from the CC2 amplitude adjusting section 807b, and then outputs the coded and modulated signal to the CC2 transmitting section 809b.

The CC1 transmitting section 809a transmits the signal coded and modulated by the CC1 coding-and-modulating section 808a to the base station 801. The CC2 transmitting section 809b transmits the signal coded and modulated by the CC2 coding-and-modulating section 808b to the base station 201.

The wireless-communication-quality measuring section 810 measures the downlink wireless communication quality concerning each of the component carriers CC1 and CC2. The wireless-communication-quality measuring section 810 outputs measurement results of the downlink wireless communication qualities to the downlink TPC method determining section 811 and the downlink TPC section 814.

The downlink TPC method determining section 811 updates the DLCC grouping table 812 based on the measurement results obtained by the wireless-communication-quality measuring section 810. If it is the mobile device 202 that makes a determination as to whether to start or stop the downlink TPC information saving mode, the downlink TPC method determining section 811 determines whether to start or stop the downlink TPC information saving mode.

The DLCC grouping table 812 stores CC grouping information therein. The DLCC grouping table 812 is generated and updated in response to an instruction from the base station 201. If there is a newly allocated component carrier or there is a component carrier to be added to a DLCC group due to a change in communication environments, information indicating the existence of such a component carrier is supplied from the base station 201. In contrast, if the wireless communication quality has deteriorated or excess of component carriers is observed due to a change in communication environments and a component carrier will thus be deleted from a DLCC group, information indicating the existence of such a component carrier is supplied from the mobile device 202 to the base station 201. It is noted that the DLCC grouping table 812 may be generated, stored, and updated by the mobile device 202. In this case, by sending a copy of the DLCC grouping table 812 to the base station 201, synchronization of the DLCC grouping table 812 between the base station 201 and the mobile device 202 may be established.

If the mobile device 202 updates the DLCC grouping table 812, every time the DLCC grouping table 812 is updated, the downlink TPC method notifying section 813 outputs information indicating that the DLCC grouping table 812 has been updated to the downlink TPC signal generating section 815.

When the downlink TPC information saving mode is started, the downlink TPC section 814 performs TPC only for one component carrier included in a target DLCC group in accordance with predetermined arrangements. The downlink TPC section 814 stops transmitting TPC information concerning the other component carriers included in the same DLCC group to the base station 201.

The downlink TPC signal generating section 815 generates a control signal based on update information concerning the component carrier CC1 output from the downlink TPC method notifying section 813. The downlink TPC signal generating section 815 generates this control signal also based on the TPC information concerning the component carrier CC1 output from the downlink TPC section 814. The downlink TPC signal generating section 815 then outputs the generated control signal concerning the component carrier CC1 to the CC1 storage section 816a.

The downlink TPC signal generating section 815 also generates a control signal based on update information concerning the component carrier CC2 output from the downlink TPC method notifying section 813. The downlink TPC signal generating section 815 generates this control signal also based on the TPC information concerning the component carrier CC2 output from the downlink TPC section 814. The downlink TPC signal generating section 815 then outputs the generated control signal concerning the component carrier CC2 to the CC2 storage section 816b.

The CC1 storage section 816a stores the control signal concerning the component carrier CC1 generated by the downlink TPC signal generating section 815 in a transmit-data control channel. The CC2 storage section 816b stores the control signal concerning the component carrier CC2 generated by the downlink TPC signal generating section 815 in the transmit-data control channel.

The CC1 coding-and-modulating section 808a codes and modulates the control signal concerning the component carrier CC1 stored in the transmit-data control channel by the CC1 storage section 816a, and outputs the coded and modulated control signal to the CC1 transmitting section 809a. The CC2 coding-and-modulating section 808b codes and modulates the control signal concerning the component carrier CC2 stored in the transmit-data control channel by the CC2 storage section 816b, and outputs the coded and modulated control signal to the CC2 transmitting section 809b.

In downlink communication, the base station 201 is a transmission side and the mobile device 202 is a reception side. Accordingly, it is the mobile device 202 that is able to detect the wireless communication qualities of all component carriers. Thus, the mobile device 202 may generate and update the DLCC grouping table 812 (DLCC grouping table 713 of the base station 201). However, unlike the base station 201, resources of the mobile device 202, such as the throughput and the battery capacity, are restricted to a minimal level. Thus, in this embodiment, in downlink communication, as well as in uplink communication, the base station 201 generates and updates the DLCC grouping table 713 (DLCC grouping table 812 of the mobile device 202).

(Example of Grouping of Uplink Component Carriers)

Figure 9:
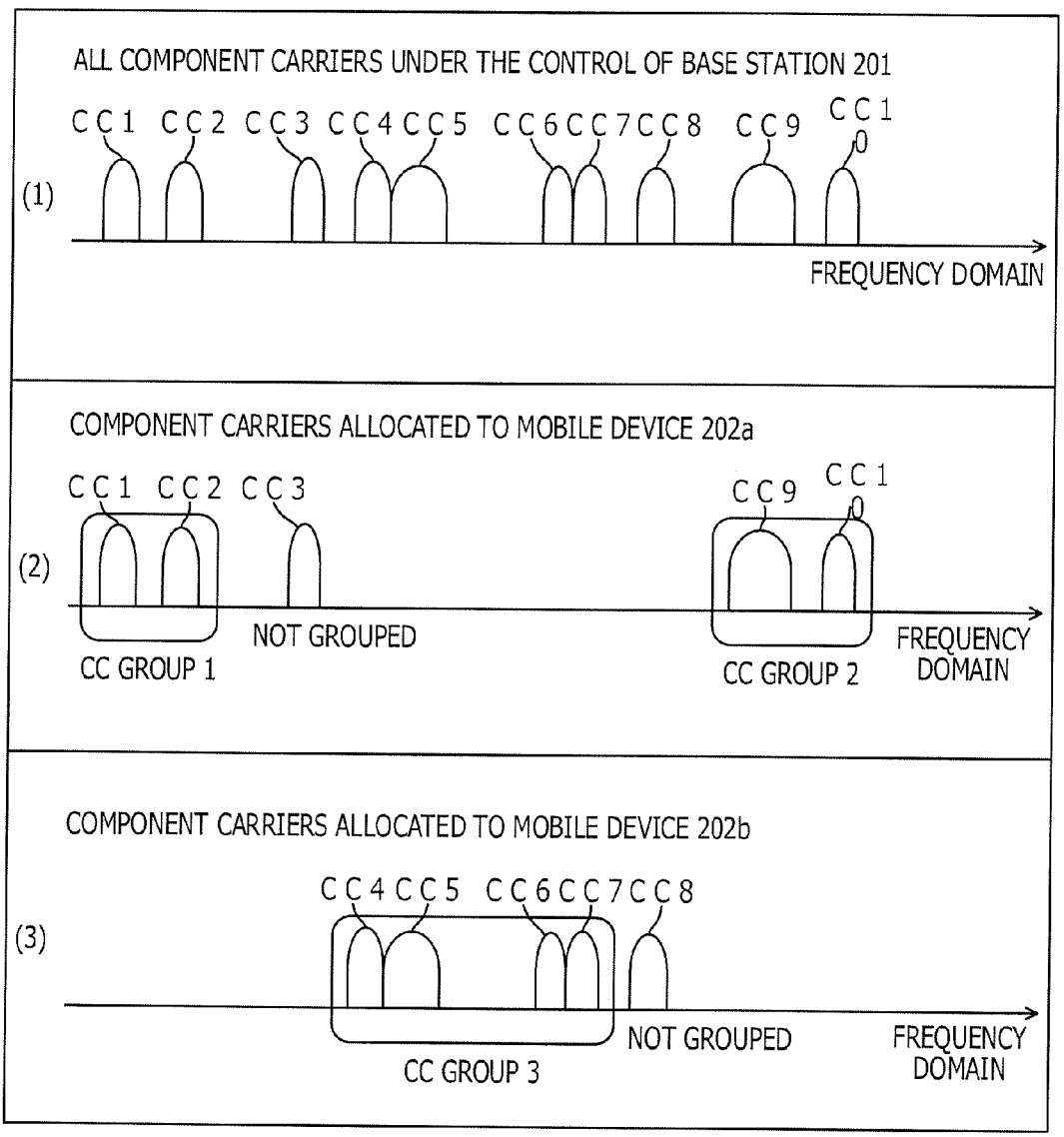
FIG. 9 illustrates an example of grouping of uplink component carriers.

FIG. 9 illustrates an example of grouping of uplink component carriers. In FIG. 9, (1) illustrates uplink component carriers CC1 through CC10, which are all uplink component carriers under the control of the base station 201.

In FIG. 9, (2) illustrates uplink component carriers allocated to the mobile device 202a. More specifically, five component carriers CC1, CC2, CC3, CC9, and CC10 are allocated to the mobile device 202a. The component carriers CC1 and CC2 are grouped into a CC group 1. The component carriers CC9 and CC10 are grouped into a CC group 2. The component carrier CC3 is not grouped together with any component carrier. When performing uplink TPC, a common item of TPC information is used for component carriers included in the same CC group.

In FIG. 9, (3) illustrates uplink component carriers allocated to the mobile device 202b. More specifically, five component carriers CC4, CC5, CC6, CC7, and CC8 are allocated to the mobile device 202b. The component carriers CC4, CC5, CC6, and CC7 are grouped into a CC group 3. The component carrier CC8 is not grouped together with any component carrier. When performing uplink TPC, a common item of TPC information is used for component carriers included in the same CC group.

(Example of Grouping of Downlink Component Carriers)

Figure 10:
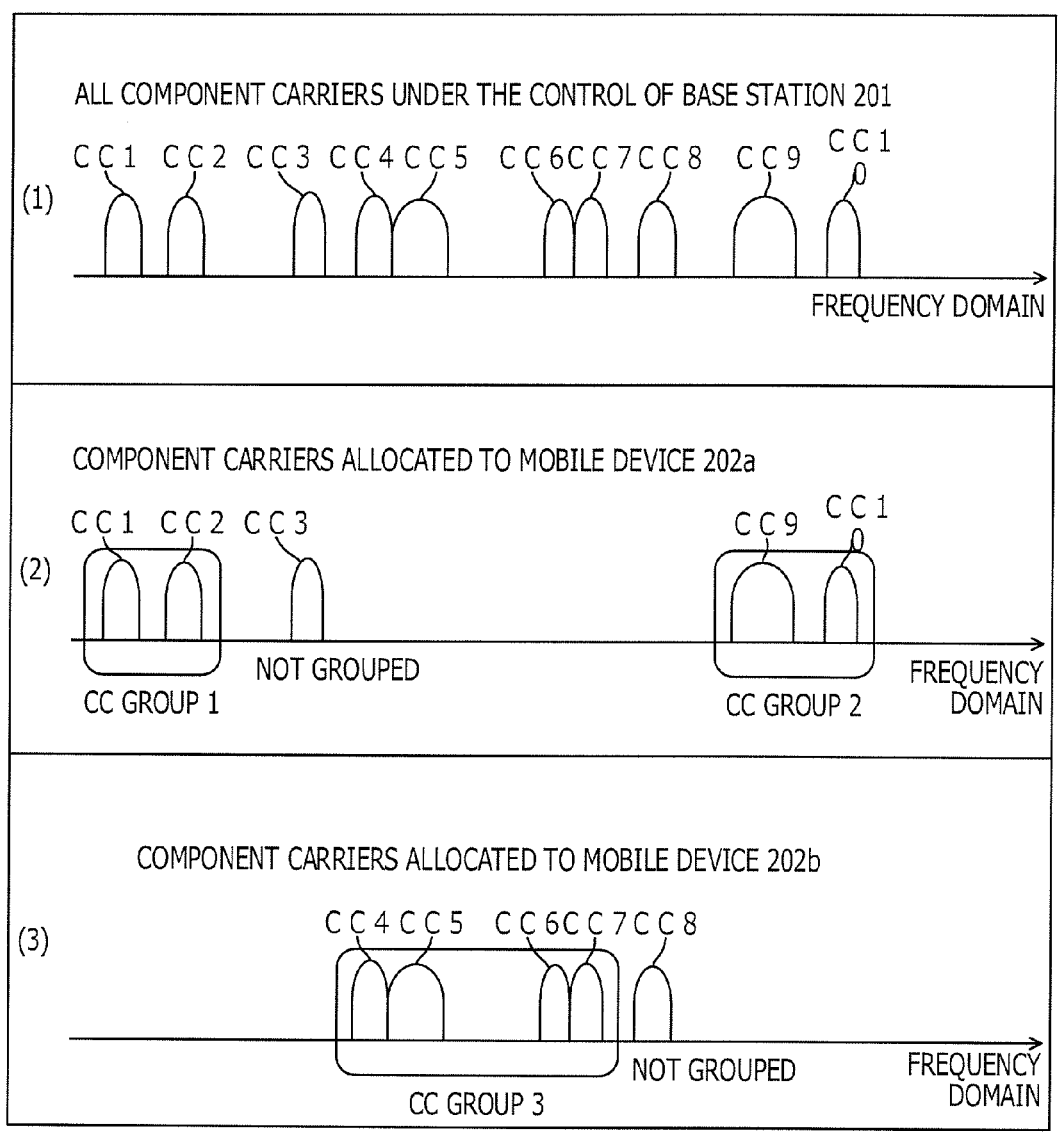
FIG. 10 illustrates an example of grouping of downlink component carriers.

FIG. 10 illustrates an example of grouping of downlink component carriers. In FIG. 10, (1) illustrates downlink component carriers CC1 through CC10, which are all downlink component carriers under the control of the base station 201.

In FIG. 10, (2) illustrates downlink component carriers allocated to the mobile device 202a. More specifically, five component carriers CC1, CC2, CC3, CC9, and CC10 are allocated to the mobile device 202a. The component carriers CC1 and CC2 are grouped into a CC group 1. The component carriers CC9 and CC10 are grouped into a CC group 2. The component carrier CC3 is not grouped together with any component carrier. When performing downlink TPC, a common item of TPC information is used for component carriers included in the same CC group.

In FIG. 10, (3) illustrates downlink component carriers allocated to the mobile device 202b. More specifically, five component carriers CC4, CC5, CC6, CC7, and CC8 are allocated to the mobile device 202b. The component carriers CC4, CC5, CC6, and CC7 are grouped into a CC group 3. The component carrier CC8 is not grouped together with any component carrier. When performing downlink TPC, a common item of TPC information is used for component carriers included in the same CC group.

(Example of ULCC Grouping Table)

FIG. 11 illustrates an example of the ULCC grouping table 705 stored in the base station 201. The ULCC grouping table 705 is implemented by using a storage device, such as the memory 502 illustrated in FIG. 5. The ULCC grouping table 705 may indicate a result of grouping of uplink component carriers illustrated in FIG. 9.

The ULCC grouping table 705 has, as illustrated in FIG. 11, a mobile device ID field, a TPC information saving mode application information field, a CCID field, a reference CC flag field, and a group ID field. The ULCC grouping table 705 also has a closed-loop transmission power accumulation result field and a wireless-communication-quality determination result field.

By inputting items of information in the above-described fields, ULCC grouping data items 1100-1, 1100-2, 1100-3, and so on, are stored in the ULCC grouping table 705 as records. Each of the ULCC grouping data items 1100-1, 1100-2, 1100-3, and so on, is a combination of a mobile device ID, TPC information saving mode application information, a CCID, a reference CC flag, a group ID, a closed-loop transmission power accumulation result, and a wireless-communication-quality determination result.

Details of the individual fields in the ULCC grouping table 705 are as follows. The mobile device ID indicates the ID of a mobile device 202. The TPC information saving mode application information indicates whether or not the TPC information saving mode will be applied. "1" in this field indicates that the TPC information saving mode will be applied, while "0" in this field indicates that the TPC information saving mode will not be applied. In the TPC information saving mode application information field, 1 is input as a default. The CCID indicates the ID of a component carrier.

The reference CC flag indicates whether or not a corresponding component carrier is a CC which is grouped with another component carrier as a reference (reference CC). "1" in this field indicates that the component carrier is a reference CC, while "0" in this field indicates that the component carrier is not a reference CC. The group ID indicates the ID of a CC group. To form a CC group, grouping is performed for each mobile device 202 by extracting and grouping component carriers together from component carriers allocated to each mobile device 202. Accordingly, component carriers of one mobile device 202 are not grouped into the same CC group as that of component carriers of another mobile device 202. The group ID may be represented by the ID of a group of each mobile device 202. More specifically, the group ID may be represented by a combination of "mobile device No." and "group No".

The closed-loop transmission power accumulation result indicates an accumulated variable (controlled variable) of transmission power starting from a time after grouping of component carrier has finished until when the TPC information saving mode is started. The wireless-communication-quality determination result indicates whether or not the wireless communication quality has reached a predetermined quality. For example, "0" in this field indicates that the wireless communication obtained as a result of performing TPC in the TPC information saving mode a predetermined number of times or for a predetermined period quality has not reached the predetermined quality. "1" in this field indicates that the wireless communication quality obtained as a result of performing group TPC in the TPC information saving mode a predetermined number of times or for a predetermined period has reached the predetermined quality. If the wireless-communication-quality determination result indicates 0, the corresponding component group will be excluded from the CC group later.

(Example of DLCC Grouping Table)

FIG. 12 illustrates an example of the DLCC grouping table 713 stored in the base station 201. The DLCC grouping table 713 is implemented by using a storage device, such as the memory 502 illustrated in FIG. 5. The DLCC grouping table 713 may be obtained as a result of grouping downlink component carriers illustrated in FIG. 10. An explanation of the same content as that discussed for the ULCC grouping table 705 illustrated in FIG. 11 will be omitted.

DLCC grouping data items 1200-1, 1200-2, 1200-3, and so on, are stored in the DLCC grouping table 713 as records. Each of the DLCC grouping data items 1200-1, 1200-2, 1200-3, and so on, is a combination of a mobile device ID, TPC information saving mode application information, a CCID, a reference CC flag, a group ID, a closed-loop transmission power accumulation result, and a wireless-communication-quality determination result.

(Example of TPC Processing in Uplink Tpc Information Saving Mode Performed by Base Station)

Figure 13:
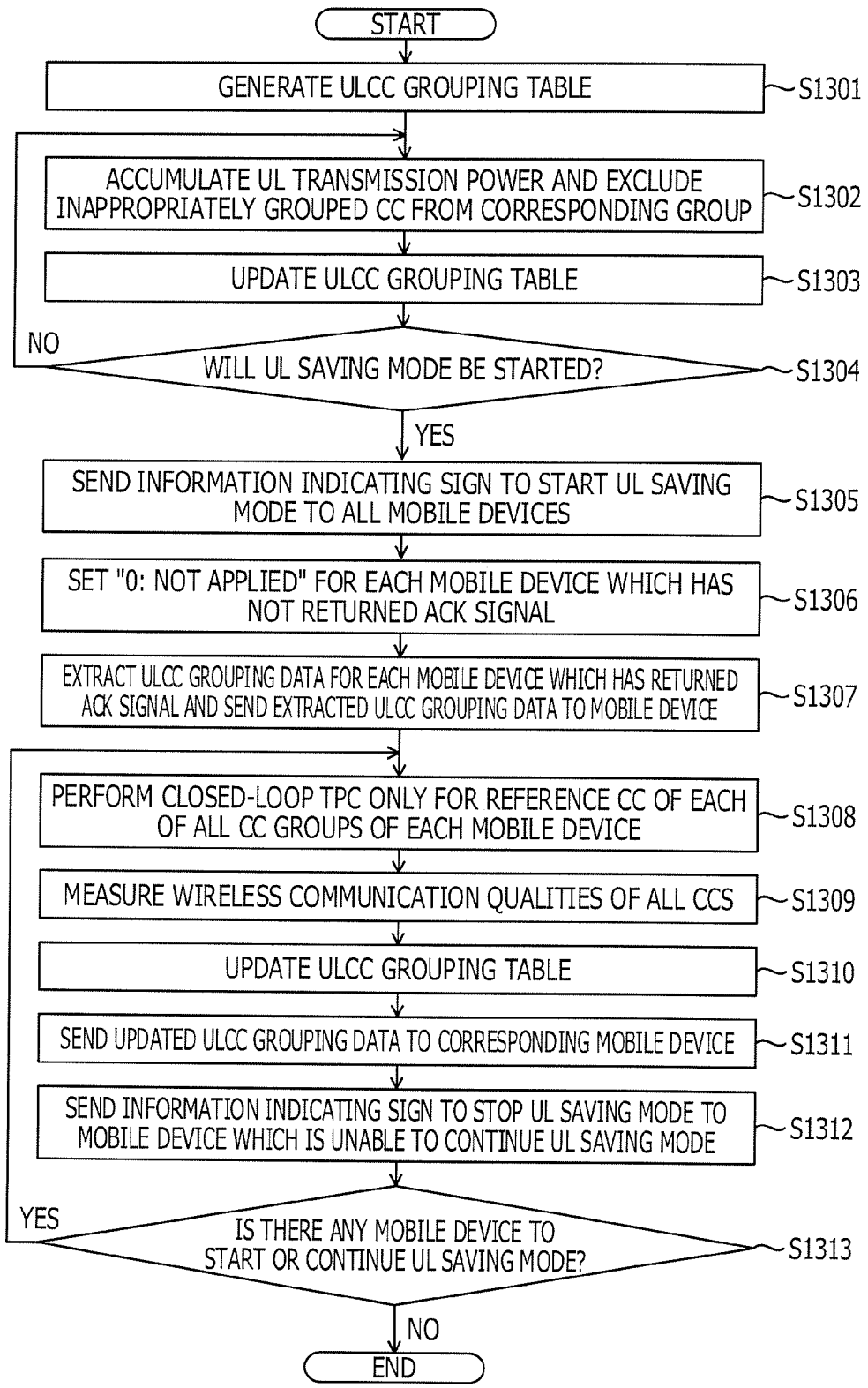
FIG. 13 is a flowchart illustrating an example of TPC processing performed by a base station in an uplink TPC information saving mode.

FIG. 13 is a flowchart illustrating an example of TPC processing performed by the base station 201 in the uplink TPC information saving mode. In step S1301, the base station 201 generates the ULCC grouping table 705 (see FIG. 11). Then, in step S1302, the base station 201 accumulates uplink transmission power and excludes an inappropriately grouped component carrier from a corresponding CC group.

Then, in step S1303, the base station 201 updates the ULCC grouping table 705. More specifically, the base station 201 deletes a component carrier which is no longer used for communication, adds a new component carrier, or reassigns an excluded component carrier to an appropriate group.

Figure 14:
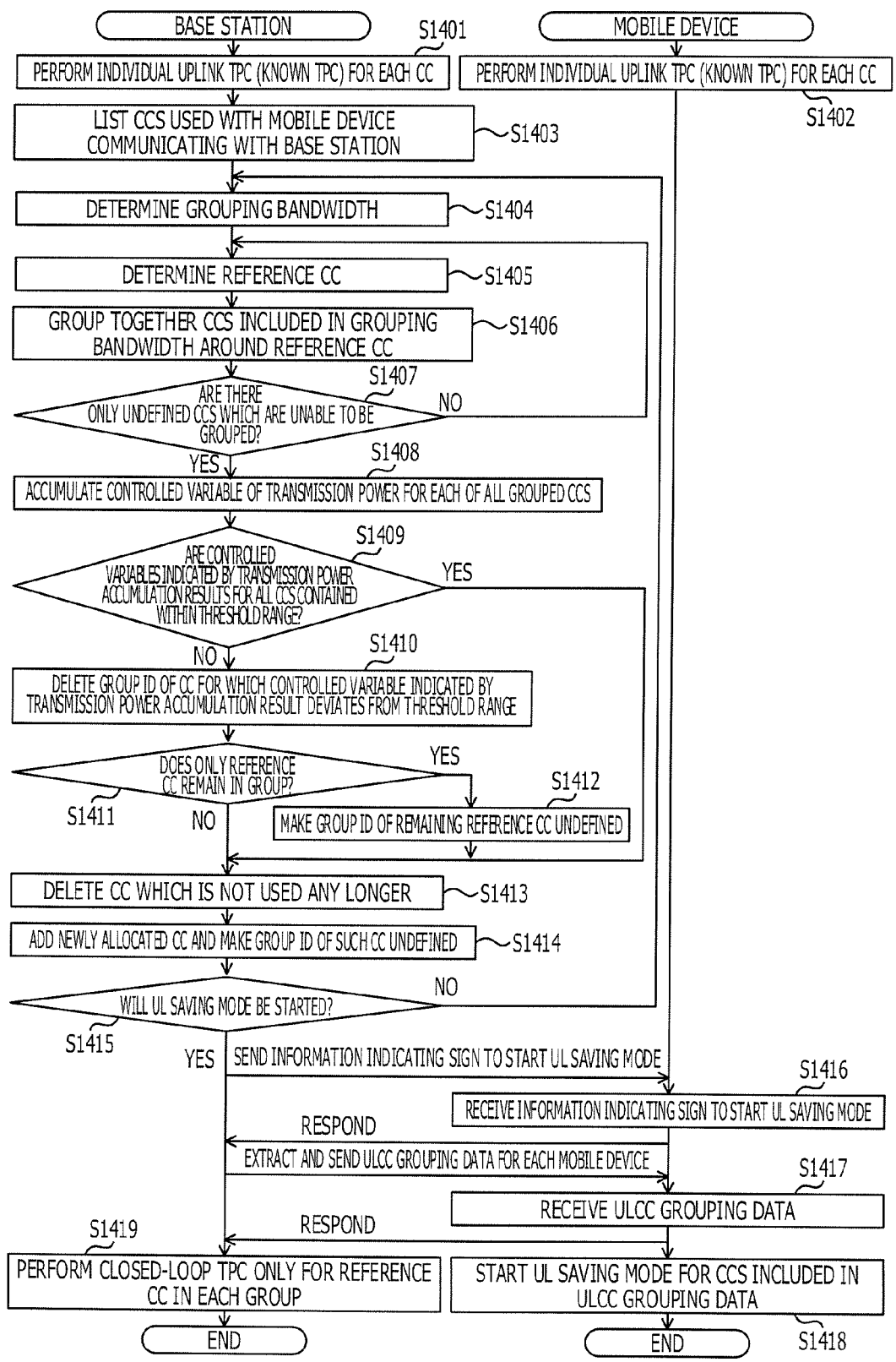
FIG. 14 is a sequence diagram illustrating an example of processing performed by a base station and a mobile device when the uplink TPC information saving mode is started.
Figure 16:
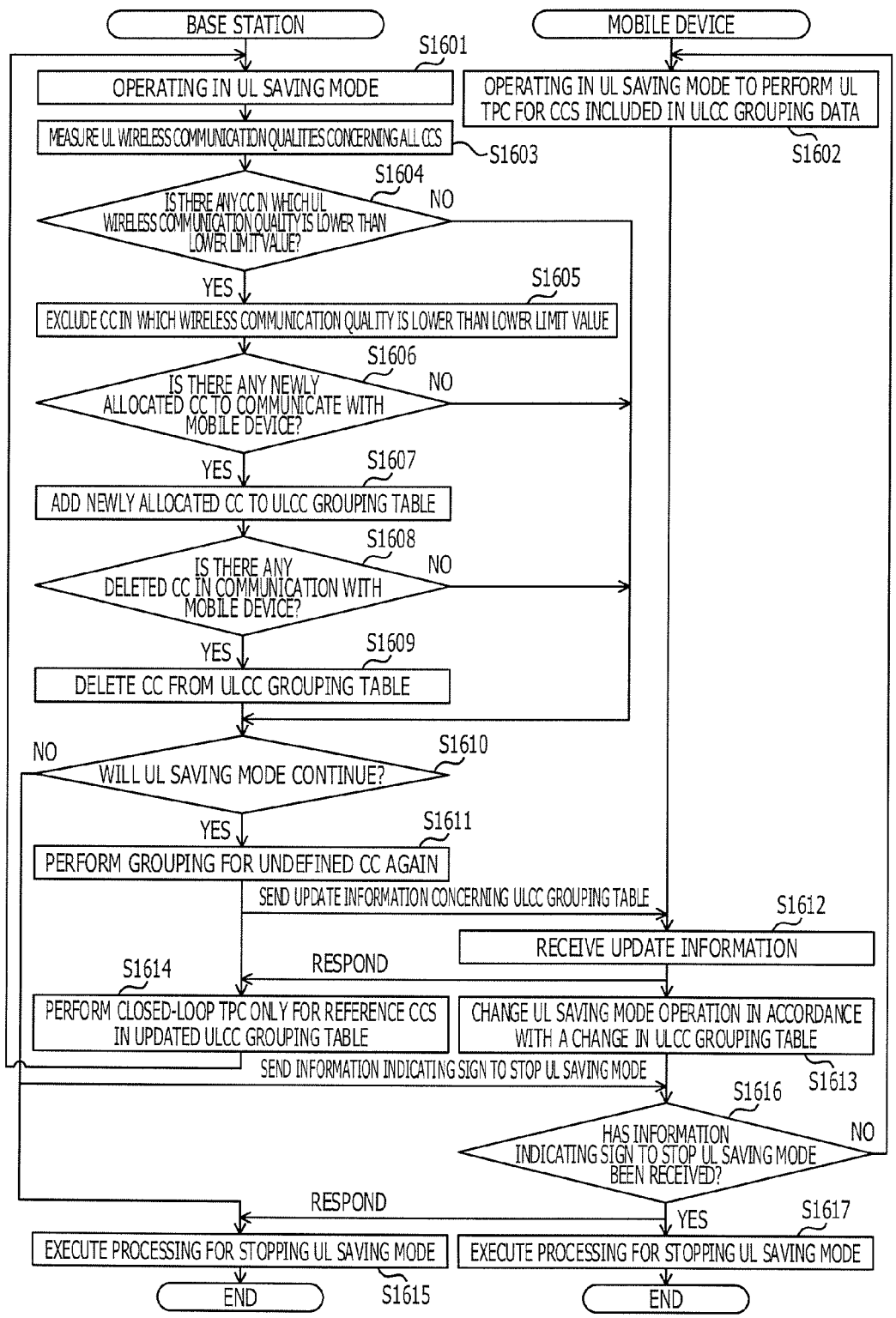
FIG. 16 is a sequence diagram illustrating an example of processing performed by a base station and a mobile device in the uplink TPC information saving mode.

Then, in step S1304, the base station 201 determines whether or not to start the uplink TPC information saving mode (illustrated as a UL saving mode in FIGS. 13, 14, and 16). For example, the base station 201 calculates, for a predetermined period of time, an accumulated variable (controlled variable) of transmission power concerning each component carrier based on a TPC command. Then, if the maximum difference in the accumulated transmission power concerning each component carrier is equal to or smaller than a predetermined threshold, the base station 201 determines that the uplink TPC information saving mode will be started.

If the uplink TPC information saving mode will not be started, that is, if the result of step S1304 is NO, the base station 201 returns to step S1302. If the uplink TPC information saving mode will be started, that is, if the result of step S1304 is YES, the base station 201 proceeds to step S1305. In step S1305, the base station 201 sends information indicating a sign to start the uplink TPC information saving mode to all mobile devices 202.

Then, in step S1306, concerning each mobile device 202 which has not returned an ACK signal, the base station 201 inputs "0: not applied" into the TPC information saving mode application information field concerning such a mobile device 202 in the ULCC grouping table 705. Then, in step S1307, concerning each mobile device 202 which has returned an ACK signal, the base station 201 extracts an item of ULCC grouping data 1100 (see FIG. 11) for each mobile device 202, and sends the extracted item of ULCC grouping data 1100 to the corresponding mobile device 202.

Then, in step S1308, the base station 201 performs closed-loop TPC only for a reference CC of each of all the CC groups of each mobile device 202. Then, in step S1309, the base station 201 measures wireless communication qualities concerning all the component carriers. In step S1310, the base station 201 then updates the ULCC grouping table 705. For example, the base station 201 excludes a component carrier in which the wireless communication quality is decreased from a corresponding CC group, deletes a component carrier which is not used for communication any longer, adds a new component carrier, or reallocates an excluded component carrier to an appropriate group.

Then, in step S1311, the base station 201 sends the updated ULCC grouping data 1100 to a corresponding mobile device 202. Then, in step S1312, the base station 201 sends information indicating a sign to stop the uplink TPC information saving mode to a mobile device 202 that is unable to continue the uplink TPC information saving mode. In this case, the reason why the mobile device 202 is unable to continue the uplink TPC information saving mode may be due to a bad reception condition of radio waves. In step S1313, the base station 201 then determines whether or not there is a mobile device 202 which will start or continue the uplink TPC information saving mode.

If the result of step S1313 is YES, the base station 201 returns to step S1308. If the result of step S1313 is NO, the base station 201 terminates the entire processing.

(Example of Processing when Uplink Tpc Information Saving Mode is Started)

FIG. 14 is a sequence diagram illustrating an example of processing performed by the base station 201 and the mobile device 202 when the uplink TPC information saving mode is started. In step S1401, the base station 201 performs individual uplink TPC (known TPC) for each component carrier. In step S1402, the mobile device 202 also performs individual uplink TPC (known TPC) for each component carrier.

In step S1403, the base station 201 lists component carriers used together with the mobile device 202 which is communicating with the base station 201. For example, the base station 201 inputs items of information into the mobile device ID field and the CCID field of the ULCC grouping table 705.

Then, in step S1404, the base station 201 determines the grouping bandwidth (F_group). The grouping bandwidth is a frequency bandwidth (a frequency range). The base station 201 determines the grouping bandwidth in accordance with, for example, the position, the moving rate, and the frequency band of the mobile device 202.

In step S1405, the base station 201 selects one component carrier to be used as the reference CC in each group. For example, the base station 201 selects as a reference CC a component carrier mapped onto a control channel or a component carrier mapped onto a data channel, or randomly selects a component carrier as the reference CC. Then, in step S1406, the base station 201 performs grouping to aggregate component carriers which are included in the grouping bandwidth around the determined reference CC. An example of a grouping operation will be discussed later with reference to FIG. 15A.

The base station 201 then determines in step S1407 whether or not there are only undefined component carriers which are unable to be grouped. If the result of step S1407 is NO, the base station 201 returns to step S1405. If the result of step S1407 is YES, the base station 201 proceeds to step S1408. In step S1408, the base station 201 accumulates a controlled variable of transmission power concerning each of all the component carriers which have been grouped.

The base station 201 then determines in step S1409 whether or not accumulated controlled variables indicated by the transmission power accumulation results for all the component carriers are contained within a threshold range. If the result of step S1409 is YES, the base station 201 proceeds to step S1413.

If the result of step S1409 is NO, the base station 201 proceeds to step S1410. In step S1410, the base station 201 deletes a group ID of a component carrier for which a controlled variable indicated by the transmission power accumulation result deviates from the threshold range from the ULCC grouping table 705.

The base station then determines in step S1411 whether or not only the reference CC is a remaining component carrier in a group. If the result of step S1411 is NO, the base station 201 proceeds to step S1413. If the result of step S1411 is YES, that is, if the ULCC group includes only the reference CC, the base station 201 proceeds to step S1412. In step S1412, the base station 201 makes the group ID of a remaining reference CC in the ULCC grouping table 705 undefined.

Then, in step S1413, if there is any component carrier that is not used any longer, the base station 201 deletes such a component carrier from the ULCC grouping table 705. Then, in step S1414, the base station 201 adds a newly allocated component carrier to the ULCC grouping table 705 and makes the group ID of such a component carrier undefined.

The base station 201 then determines in step S1415 whether or not to start the uplink TPC information saving mode. For example, the base station 201 calculates, for a predetermined period of time, an accumulated variable (controlled variable) of transmission power concerning each component carrier based on a TPC command. Then, if the maximum difference in the accumulated transmission power concerning each component carriers is equal to or smaller than a predetermined threshold, the base station 201 determines that the uplink TPC information saving mode will be started.

If the uplink TPC information saving mode will not be started, that is, if the result of step S1415 is NO, the base station 201 returns to step S1404. If the uplink TPC information saving mode will be started, that is, if the result of step S1415 is YES, the base station 201 sends information indicating a sign to start the uplink TPC information saving mode to the mobile device 202.

Then, in step S1416, the mobile device 202 receives the information indicating a sign to start the uplink TPC information saving mode. Then, the mobile device 202 returns an ACK signal to the base station 201, and, in step S1417, the mobile device 202 receives the ULCC grouping data 1100 extracted for this mobile device 202. Then, the mobile device 202 returns an ACK signal to the base station 201, and, in step S1418, the mobile device 202 starts the uplink TPC information saving mode for the component carriers' included in the ULCC grouping data 1100. The mobile device 202 then terminates the processing.

Meanwhile, upon receiving the ACK signal from the mobile device 202 in response to the ULCC grouping data 1100, in step S1419, the base station 201 performs closed-loop TPC only for the reference CC in each CC group, and terminates the processing. Information indicating a sign to start the uplink TPC information saving mode and the ULCC grouping data 1100 are sent in a predetermined format from the base station 201 to the mobile device 202 by using a physical downlink control channel (PDCCH).

(Example of Grouping Operation)

Figure 15A:
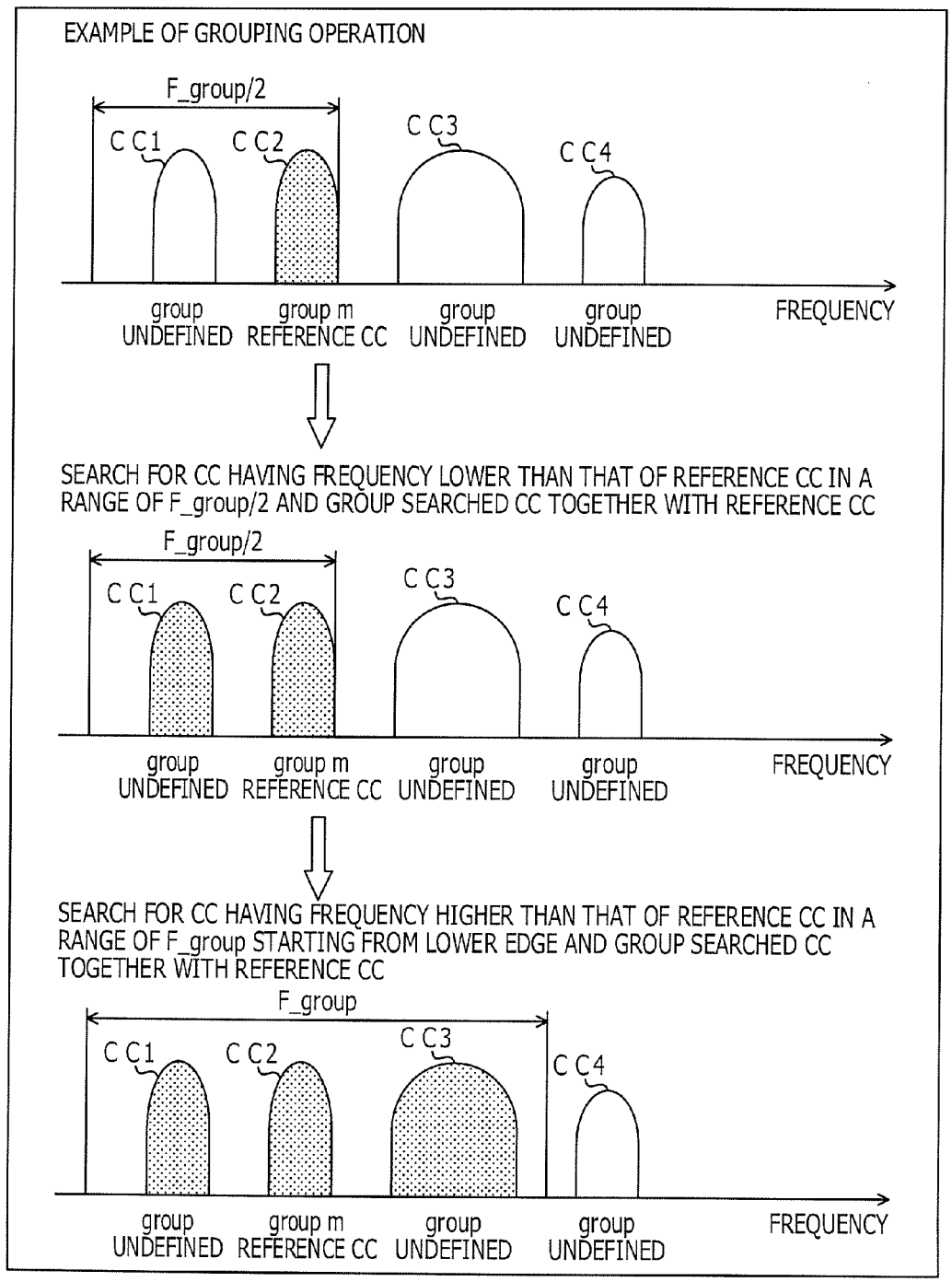
FIG. 15A illustrates an example of a grouping operation.

FIG. 15A illustrates an example of a grouping operation. As illustrated in FIG. 15A, there are four component carriers CCs (CC1, CC2, CC3, and CC4) in the base station 201. Among the four CCs, for example, a CC which has mapped onto the control channel or a CC which has mapped onto the data channel is determined as the reference CC(CC2). The base station 201 searches for a CC having a frequency lower than that of the reference CC.

For example, the base station 201 searches for a CC having a frequency lower than that of the reference CC in a range (F_group/2), which is half the grouping bandwidth (F_group), and aggregates the searched CC(CC1) with the reference CC. That is, the base station 201 searches for a CC having the lowest frequency starting from the lower edge, and then aggregates the searched CC(CC1) with the reference CC. The base station 201 also searches for a CC having a frequency higher than that of the reference CC in a range of the grouping bandwidth (F_group) and aggregates the searched CC(CC3) with the reference CC. In this manner, the base station 201 performs grouping to aggregate the component carriers CC1 and CC3 based on the reference CC.

(Example of Channel Edges to be Adjusted when Performing Grouping)

Figure 15B:
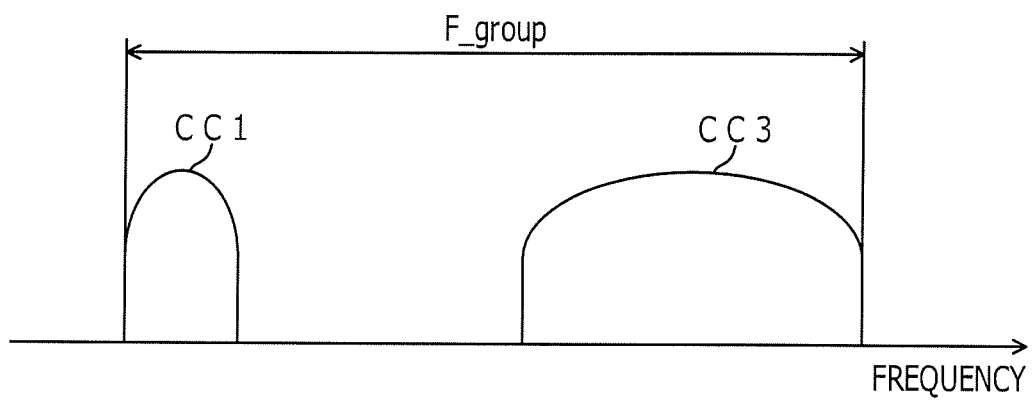
FIG. 15B illustrates an example of channel edges to be adjusted when grouping of component carriers is performed.

FIG. 15B illustrates an example of channel edges to be adjusted when performing grouping of component carriers. The base station 201 performs grouping for component carriers which are exclusively used between this base station 201 and a certain mobile device 202, and performs common closed-loop TPC for all component carriers in a group.

Grouping is performed based on a distance (F_group) on the frequency domain. As illustrated in FIG. 15B, when grouping is performed, the component carrier CC1 having a lower frequency is adjusted to the lower channel edge, while the component carrier CC3 having a higher frequency is adjusted to the upper channel edge.

The initial value of F_group may be set in accordance with the frequency band. For example, the bandwidth of F_group is set as wide as possible for a lower frequency band. For example, about 60 MHz is set for an 800 MHz band. In contrast, the bandwidth of F_group is set as narrow as possible for a higher frequency band. For example, about 50 MHz is set for a 2 GHz band.

The initial value of F_group may be set in accordance with the state of the mobile device 202, such as the position or the moving rate. For example, if the mobile device 202 is found to be moving based on, for example, GPS information, the base station 201 decreases the initial value of F_group in accordance with the moving rate. If the mobile device 202 is in a train moving at a rate of about 60 Km while communicating with the base station 201 by using an 800 MHz band, the base station 201 decreases F_group from 60 MHz to 40 MHz.

If the mobile device 202 is found to be in an office district based on, for example, GPS information, the base station 201 decreases the initial value of F_group in accordance with the condition of the location of the mobile device 202. The condition of the location refers to the shielding degree of radio waves between the base station 201 and the mobile device 202. More specifically, if the mobile device 202 is in a place in which high-rise buildings stand together while communicating with the base station 201 by using a 2 GHz band, that is, if the shielding degree between the base station 201 and the mobile device 202 is high, the base station 201 decreases F_group from 50 MHz to 40 MHz.

F_group may be changed while it is being used. For example, if a large variation in the accumulated controlled variables of transmission power among component carriers is found after grouping has been performed, F_group is decreased, and then, grouping is performed again. If common closed-loop TPC (TPC information saving mode) is not sustainable for a long time (for example, sufficient wireless communication qualities of all component carriers in a group, except for a reference CC, are not maintained at all after performing common TPC about ten times), F_group may be decreased, and then, grouping may be performed again. In this manner, by decreasing F_group, it is possible to stably perform common closed-loop TPC.

(Example of Processing Performed in Uplink Tpc Information Saving Mode)

FIG. 16 is a sequence diagram illustrating an example of processing performed by the base station 201 and the mobile device 202 in uplink TPC information saving mode. In step S1601, the base station 201 is operating in the uplink TPC information saving mode. In step S1602, the mobile device 202 is also operating in the uplink TPC information saving mode to perform uplink TPC for component carriers included in the ULCC grouping data 1100.

In step S1603, the base station 201 measures wireless communication qualities concerning all the component carriers. Then, in step S1604, the base station 201 determines whether or not there is a component carrier in which the uplink wireless communication quality is lower than a lower limit value (predetermined quality). If the result of step S1604 is NO, that is, if the uplink wireless communication qualities concerning all the component carriers are equal to or higher than the predetermined quality, the base station 201 proceeds to step S1610.

If the result of step S1604 is YES, that is, if there is a component carrier in which the uplink wireless communication quality is lower than the predetermined quality, the base station 201 proceeds to step S1605. In step S1605, the base station 201 excludes a component carrier in which the uplink wireless communication quality is lower than the lower limit value from the ULCC grouping table 705. More specifically, the base station 201 makes the group ID field of this excluded component carrier undefined. Then, in step S1606, the base station 201 determines whether or not there is a newly allocated component carrier to communicate with the mobile device 202.

If the result of step S1606 is NO, the base station 201 proceeds to step S1610. If the result of step S1606 is YES, the base station 201 proceeds to step S1607. In step S1607, the base station 201 adds the allocated component carrier to the ULCC grouping table 705. In this case, the base station 201 makes the group ID field of this component carrier undefined.

The base station 201 then determines in step S1608 whether or not there is a deleted component carrier in communication with the mobile device 202. If the result of step S1608 is NO, the base station 201 proceeds to step S1610. If the result of step S1608 is YES, the base station 201 proceeds to step S1609. In step S1609, the base station 201 deletes this component carrier (ULCC grouping data 1100) from the ULCC grouping table 705.

The base station 201 then determines in step S1610 whether or not to continue the uplink TPC information saving mode. When there is one or no component carrier left in a CC group, the base station 201 determines that the uplink TPC information saving mode will not continue.

If the result of step S1610 is YES, the base station 201 proceeds to step S1611. In step S1611, the base station 201 performs grouping for an undefined component carrier again. Grouping is performed by a procedure indicated in steps S1404, S1405, and S1406 of FIG. 14.

Then, the base station 201 sends update information concerning the ULCC grouping table 705 to the mobile device 202. Then, in step S1612, the mobile device 202 receives the update information concerning the ULCC grouping table 705.

The mobile device 202 then returns an ACK signal to the base station 201 in response to the update information. Then, in step S1613, the mobile device 202 changes the operation using the TPC information saving mode in accordance with a change in the ULCC grouping table 705. More specifically, the mobile device 202 performs common TPC for a newly added component carrier together with a reference CC, or performs individual TPC for a component carrier which no longer belongs to any CC group.

Meanwhile, upon receiving an ACK signal from the mobile device 202, in step S1614, the base station 201 performs closed-loop TPC only for the reference CC of each CC group in the updated ULCC grouping table 705. Then, the base station 201 returns to step S1601. If the base station 201 determines in step S1610 that the uplink TPC information saving mode will not continue, that is, if the result of step S1610 is NO, the base station 201 sends information indicating a sign to stop the uplink TPC information saving mode to the mobile device 202.

Then, upon receiving an ACK signal from the mobile device 202, in step S1615, the base station 201 executes processing for stopping the uplink TPC information saving mode, and then terminates the entire processing. In this processing, the base station 201 starts individual TPC for each component carrier, and clears the ULCC grouping data 1100 in the ULCC grouping table 705.

Meanwhile, the mobile device 202 determines in step S1616 whether or not information indicating a sign to stop the uplink TPC information saving mode has been received. If the result of step S1616 is NO, the mobile device 202 returns to step S1602. If the result of step S1616 is YES, the mobile device 202 returns an ACK signal and proceeds to step S1617. In step S1617, the mobile device 202 executes processing for stopping the uplink TPC information saving mode, and then terminates the entire processing.

In step S1617, the mobile device 202 stops applying a common TPC command to component carriers in the same group, starts individual TPC for each component carrier, and clears the ULCC grouping data 1100 in the ULCC grouping table 805.

(Example of TPC Performed by Base Station in Downlink TPC Information Saving Mode)

Figure 17:
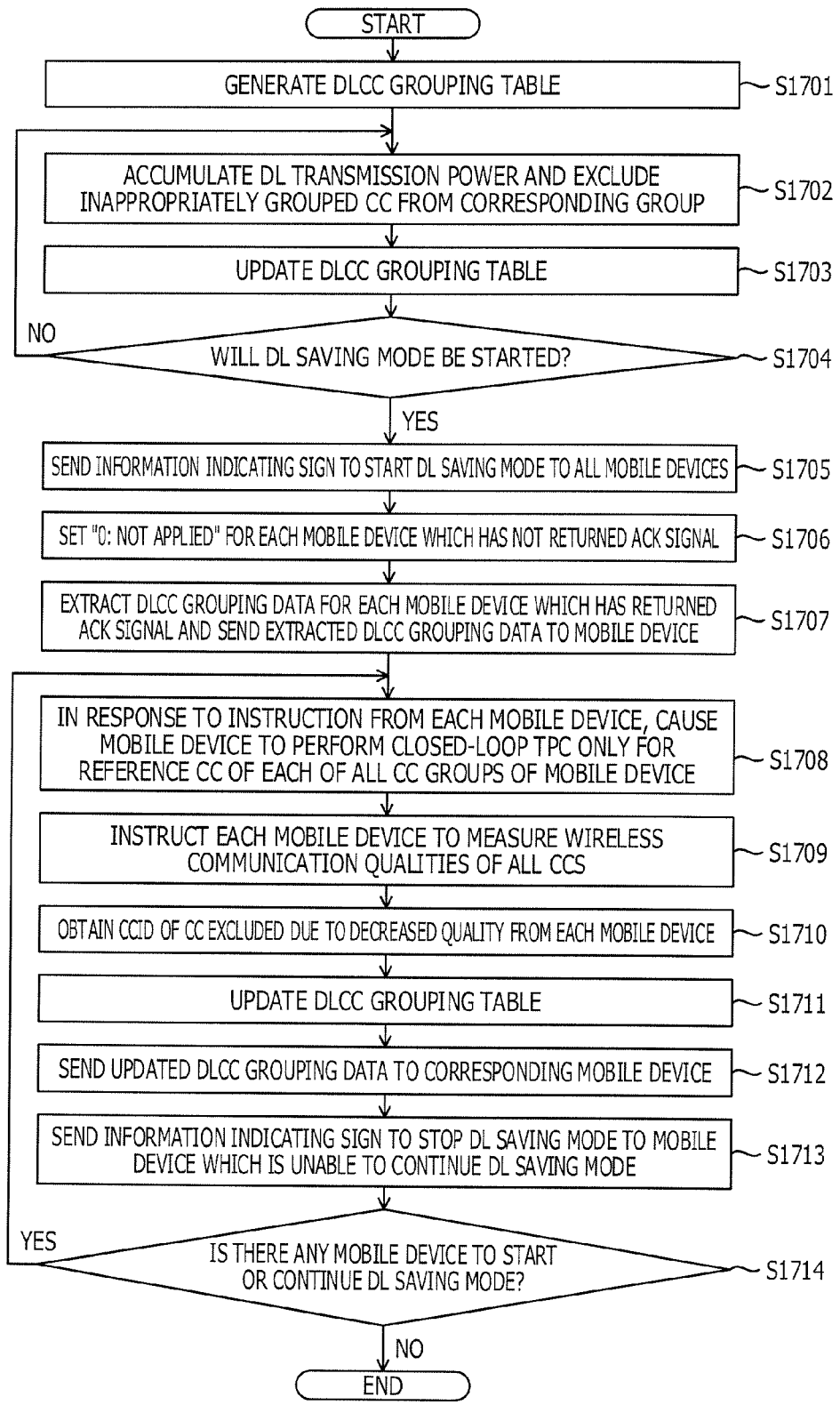
FIG. 17 is a flowchart illustrating an example of TPC processing performed by a base station in a downlink TPC information saving mode.

FIG. 17 is a flowchart illustrating an example of TPC processing performed by the base station 201 in the downlink TPC information saving mode. In step S1701, the base station 201 generates the DLCC grouping table 713 (see FIG. 12). Then, in step S1702, the base station 201 accumulates downlink transmission power and excludes an inappropriately grouped component carrier from a corresponding CC group.

Then, in step S1703, the base station 201 updates the DLCC grouping table 713. More specifically, in the DLCC grouping table 713, the base station 201 deletes a component carrier which is no longer used for communication, adds a new component carrier, or reassigns an excluded component carrier to an appropriate group.

Figure 18:
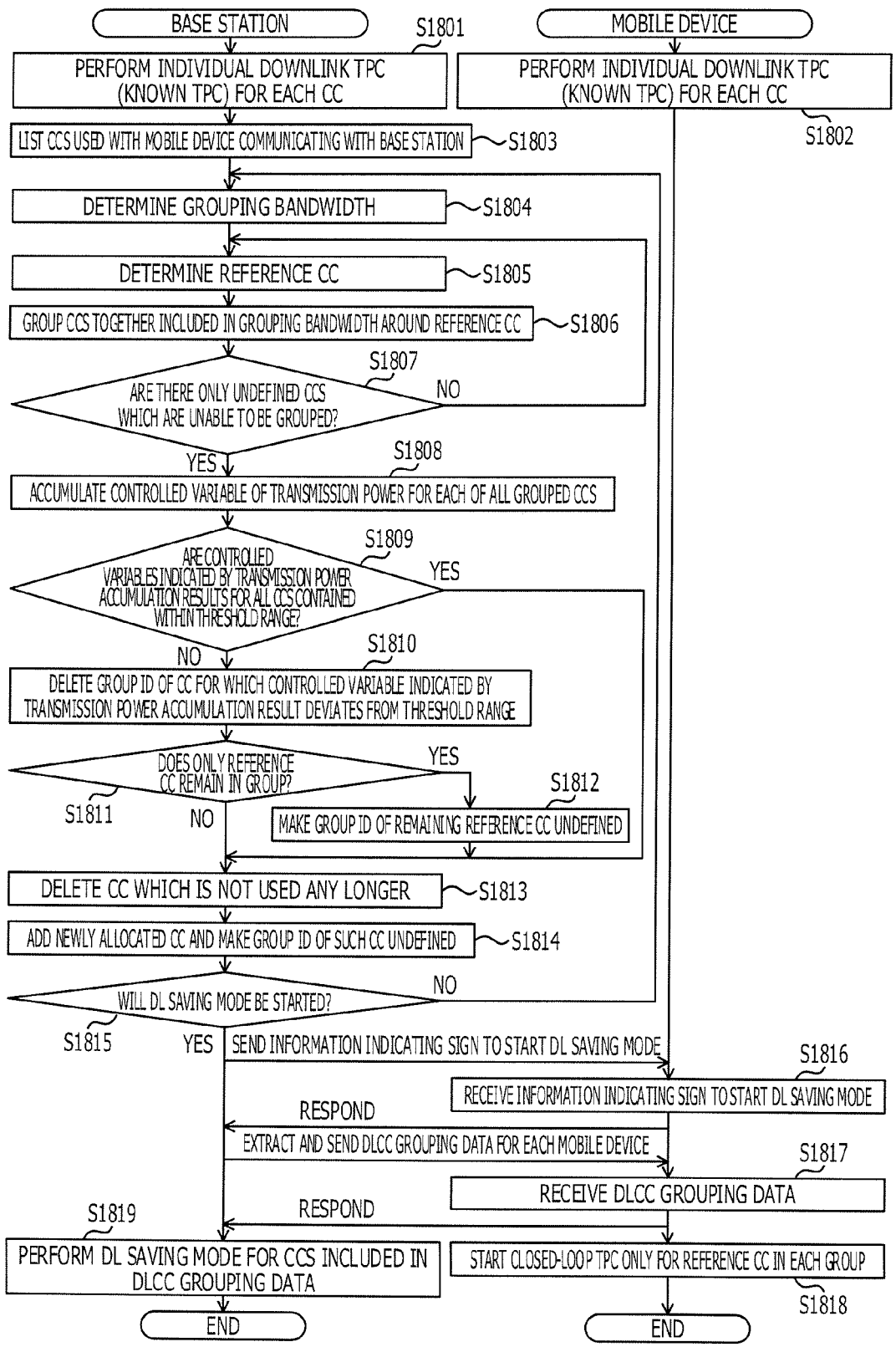
FIG. 18 is a sequence diagram illustrating an example of processing performed by a base station and a mobile device when the downlink PC information saving mode is started.
Figure 19:
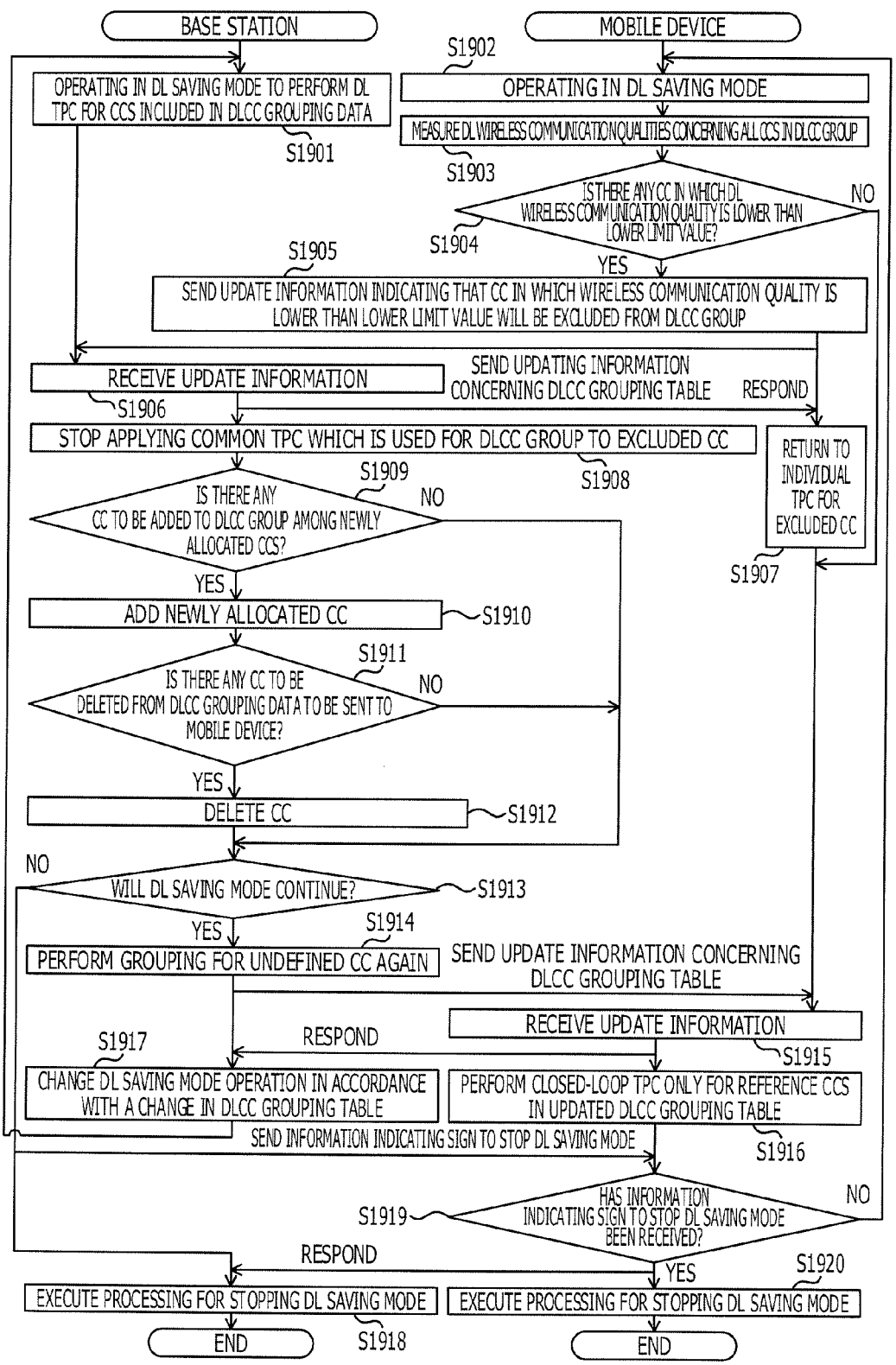
FIG. 19 is a sequence diagram illustrating an example of processing performed by a base station and a mobile device in the downlink TPC information saving mode.

Then, in step S1704, the base station 201 determines whether or not to start the downlink TPC information saving mode (illustrated as a DL saving mode in FIGS. 17, 18, and 19). For example, the base station 201 calculates, for a predetermined period of time, an accumulated variable of transmission power concerning each component carrier based on a TPC command received from the mobile device 202. Then, if the maximum difference in the accumulated transmission power concerning each component carrier is equal to or smaller than a predetermined threshold, the base station 201 determines that the downlink TPC information saving mode will be started.

A determination as to whether or not to start downlink TPC information saving mode may be made by the mobile device 202. In this case, if the maximum difference in the accumulated variable of transmission power concerning each component carrier for a predetermined period of time based on a TPC command issued to the base station 201 is equal to or smaller than the predetermined threshold, the mobile device 202 determines that the downlink TPC information saving mode will be started.

If the downlink TPC information saving mode will not be started, that is, if the result of step S1704 is NO, the base station 201 returns to step S1702. If the downlink TPC information saving mode will be started, that is, if the result of step S1704 is YES, the base station 201 proceeds to step S1705. In step S1705, the base station 201 sends information indicating a sign to start the downlink TPC information saving mode to all mobile devices 202.

Then, in step S1706, concerning each mobile device 202 which has not returned an ACK signal, the base station 201 inputs "0: not applied" into the TPC information saving mode application information field concerning such a mobile device 202 in the DLCC grouping table 713. Then, in step S1707, concerning each mobile device 202 which has returned an ACK signal, the base station 201 extracts an item of DLCC grouping data 1200 (see FIG. 12) for each mobile device 202, and sends the extracted item of DLCC grouping data 1200 to the corresponding mobile device 202.

Then, in step S1708, in response to an instruction from each mobile device 202, the base station 201 causes the mobile device 202 to perform closed-loop TPC only for a reference CC of each of all the CC groups of the mobile device 202. Then, in step S1709, the base station 201 causes each mobile device 202 to measure wireless communication qualities concerning all the component carriers. In step S1710, the base station 210 obtains the CCID of a component carrier which is excluded due to a decreased quality from each mobile device 202. The mobile device 202 performs individual closed-loop TPC for an excluded component carrier.

Then, in step S1711, the base station 201 updates the DLCC grouping table 713. For example, in the DLCC grouping table 713, the base station 201 reflects a component carrier excluded from a corresponding CC group by the mobile device 202, deletes a component carrier which is not used for communication any longer, adds a new component carrier, or reallocates an excluded component carrier to an appropriate group.

Then, in step S1712, the base station 201 sends the updated DLCC grouping data 1200 to a corresponding mobile device 202. Then, in step S1713, the base station 201 sends information indicating a sign to stop the downlink TPC information saving mode to a mobile device 202 that is unable to continue the downlink TPC information saving mode. In this case, the reason why the mobile device 202 is unable to continue the downlink TPC information saving mode may be due to a bad reception condition of radio waves. In step S1714, the base station 201 then determines whether or not there is a mobile device 202 which will start or continue the downlink TPC information saving mode.

If the result of step S1714 is YES, the base station 201 returns to step S1708. If the result of step S1714 is NO, the base station 201 terminates the entire processing.

(Example of Processing when Downlink Tpc Information Saving Mode is Started)

FIG. 18 is a sequence diagram illustrating an example of processing performed by the base station 201 and the mobile device 202 when the downlink TPC information saving mode is started. In step S1801, the base station 201 performs individual downlink TPC (known TPC) for each component carrier. In step S1802, the mobile device 202 also performs individual downlink TPC (known TPC) for each component carrier.

In step S1803, the base station 201 lists component carriers used together with the mobile device 202 which is communicating with the base station 201. For example, the base station 201 inputs items of information into the mobile device ID field and the CCID field of the DLCC grouping table 713. Then, in step S1804, the base station 201 determines the grouping bandwidth (F_group). The base station 201 determines the grouping bandwidth in accordance with, for example, the position, the moving rate, and the frequency band of the mobile device 202.

In step S1805, the base station 201 selects one component carrier to be used as the reference CC in each group. For example, the base station 201 selects as a reference CC a component carrier mapped onto a control channel or a component carrier mapped onto a data channel, or randomly selects a component carrier as the reference CC. Then, in step S1806, the base station 201 performs grouping to aggregate component carriers which are included in the grouping bandwidth around the determined reference CC.

The base station 201 then determines in step S1807 whether or not there are only undefined component carriers which are unable to be grouped. If the result of step S1807 is NO, the base station 201 returns to step S1805. If the result of step S1807 is YES, the base station 201 proceeds to step S1808. In step S1808, the base station 201 accumulates a control variable of transmission power concerning each of all the component carriers which have been grouped.

The base station 201 then determines in step S1809 whether or not the accumulated controlled variables indicated by the transmission power accumulation results for all the component carriers are contained within a threshold range. If the result of step S1809 is YES, the base station 201 proceeds to step S1813.

If the result of step S1809 is NO, the base station 201 proceeds to step S1810. In step S1810, the base station 201 deletes a group ID of a component carrier for which the accumulated controlled variable indicated by the transmission power accumulation result deviates from the threshold range from the DLCC grouping table 713.

The base station then determines in step S1811 whether or not only the reference CC is a remaining component carrier in a CC group. If the result of step S1811 is NO, the base station 201 proceeds to step S1813. If the result of step S1811 is YES, that is, if the DLCC group includes only the reference CC, the base station 201 proceeds to step S1812. In step S1812, the base station 201 makes the group ID of the remaining reference CC in the DLCC grouping table 713 undefined.

Then, in step S1813, if there is any component carrier that is not used any longer, the base station 201 deletes such a component carrier from the DLCC grouping table 713. Then, in step S1814, the base station 201 adds a newly allocated component carrier to the DLCC grouping table 713 and makes the group ID of such a component carrier undefined.

The base station 201 then determines in step S1815 whether or not to start the downlink TPC information saving mode. For example, the base station 201 calculates, for a predetermined period of time, an accumulated variable of transmission power concerning each component carrier based on a TPC command received from the mobile device 202. Then, if the maximum difference in the accumulated transmission power concerning each component carrier is equal to or smaller than a predetermined threshold, the base station 201 determines that the downlink TPC information saving mode will be started.

If the downlink TPC information saving mode will not be started, that is, if the result of step S1815 is NO, the base station 201 returns to step S1804. If the downlink TPC information saving mode will be started, that is, if the result of step S1815 is YES, the base station 201 sends information indicating a sign to start the downlink TPC information saving mode to the mobile device 202.

Then, in step S1816, the mobile device 202 receives the information indicating a sign to start the downlink TPC information saving mode. Then, the mobile device 202 returns an ACK signal to the base station 201, and, in step S1817, the mobile device 202 receives the DLCC grouping data 1200 extracted for this mobile device 202. Then, the mobile device 202 returns an ACK signal to the base station 201, and, in step S1818, the mobile device 202 performs closed-loop TPC only for a reference CC of each CC group. The mobile device 202 then terminates the processing.

Meanwhile, upon receiving an ACK signal from the mobile device 202 in response to the DLCC grouping data 1200, in step S1819, the base station 201 performs downlink TPC information saving mode for component carriers included in each group, and terminates the processing.

(Example of Processing Performed in Downlink Tpc Information Saving Mode)

FIG. 19 is a sequence diagram illustrating an example of processing performed by the base station 201 and the mobile device 202 in downlink TPC information saving mode. In step S1901, the base station 201 is operating in the downlink TPC information saving mode to perform download TPC for component carriers included in the DLCC grouping data 1200. In step S1902, the mobile device 202 is also operating in the downlink TPC information saving mode.

In step S1903, the mobile device 202 measures downlink wireless communication qualities concerning component carriers in a DLCC group. Then, in step S1904, the mobile device 202 determines whether or not there is a component carrier in which the downlink wireless communication quality is lower than a lower limit value. If the result of step S1904 is NO, the mobile device 202 proceeds to step S1915.

If the result of step S1904 is YES, the mobile device 202 proceeds to step S1905. In step S1905, the mobile device 202 sends updating information indicating that a component carrier in which the downlink wireless communication quality is lower than the lower limit value will be excluded from the DLCC group. Then, in step S1906, the base station 201 receives this updating information. The base station 201 then returns an ACK signal to the mobile device 202. Upon receiving the ACK signal, in step S1907, the mobile device 202 returns to the individual TPC mode for the excluded component carrier.

After returning an ACK signal to the mobile device 202, in step S1908, the base station 201 stops applying common TPC used for the DLCC group to the excluded component carrier. Then, the base station 201 starts individual TPC in response to a TPC command from the mobile device 202. Then, in step S1909, the base station 201 determines whether or not there is a component carrier to be added to the DLCC group among newly added component carriers.

For example, the base station 201 calculates, for a predetermined period of time, an accumulated variable of transmission power concerning a certain component carrier based on a TPC command received from the mobile device 202. Then, if the accumulated variable indicated by the accumulation result is contained within a predetermined threshold, the base station 201 determines that such a component carrier will be added to the DLCC group. A determination as to whether or not there is a component carrier to be added to the DLCC group may be made by the mobile device 202. In this case, if an accumulated variable of transmission power concerning a component carrier for a predetermined period of time based on a TPC command issued by the mobile device 202 is within the predetermined threshold, the mobile device 202 determines that this component carrier will be added to the DLCC group.

If there is no component carrier to be added to the DLCC group, that is, if the result of step S1909 is NO, the base station 201 proceeds to step S1913. If the result of step S1909 is YES, the base station 201 proceeds to step S1910. In step S1910, the base station 201 adds the allocated component carrier to the DLCC grouping table 713.

The base station 201 then determines in step S1911 whether or not there is a component carrier to be deleted from the DLCC grouping data 1200 to be sent to the mobile device 202. If the result of step S1911 is NO, the base station 201 proceeds to step S1913. If the result of step S1911 is YES, the base station 201 proceeds to step S1912. In step S1912, the base station 201 deletes this component carrier (DLCC grouping data 1200) from the DLCC grouping table 713.

The base station 201 then determines in step S1913 whether or not to continue the downlink TPC information saving mode. When there is one or no component carrier left in a CC group, the base station 201 determines that the downlink TPC information saving mode will not continue.

If the result of step S1913 is YES, the base station 201 proceeds to step S1914. In step S1914, the base station 201 performs grouping for an undefined component carrier again. Grouping is performed by a procedure indicated in steps S1804, S1805, and S1806 of FIG. 18.

Then, the base station 201 sends update information concerning the DLCC grouping table 713 to the mobile device 202. Then, in step S1915, the mobile device 202 receives this update information.

The mobile device 202 then returns an ACK signal to the base station 201 in response to the received update information. Then, in step S1916, the mobile device 202 performs closed-loop TPC only for the reference CC in each CC group included in the updated DLCC grouping table 713, and then proceeds to step S1919.

Meanwhile, upon receiving an ACK signal from the mobile device 202, in step S1917, the base station 201 changes the operation using the TPC information saving mode in accordance with a change in the DLCC grouping table 713, and then returns to step S1901. More specifically, the base station 201 performs common TPC for a new component carrier added to a CC group, together with the reference CC in the same group, or performs individual TPC for a component carrier which does not belong to any CC group.

If the base station 201 determines in step S1913 that the downlink TPC information saving mode will not continue, that is, if the result of step S1913 is NO, the base station 201 sends information indicating a sign to stop the downlink TPC information saving mode to the mobile device 202.

Then, upon receiving an ACK signal from the mobile device 202, in step S1918, the base station 201 executes processing for stopping the downlink TPC information saving mode, and then terminates the entire processing. In this processing, the base station 201 starts individual TPC for each component carrier, and clears the DLCC grouping data 1200 in the DLCC grouping table 713.

Meanwhile, the mobile device 202 determines in step S1919 whether or not information indicating a sign to stop the downlink TPC information saving mode has been received. If the result of step S1919 is NO, the mobile device 202 returns to step S1902. If the result of step S1919 is YES, the mobile device 202 returns an ACK signal and proceeds to step S1920. In step S1920, the mobile device 202 executes processing for stopping the downlink TPC information saving mode, and then terminates the entire processing.

In step S1920, the mobile device 202 stops applying a common TPC command to component carriers in the same group, starts individual TPC for each component carrier, and clears the DLCC grouping data 1200 in the DLCC grouping table 812.

A determination as to whether or not to continue the downlink TPC information saving mode in step S1913 may be made by the mobile device 202. In this case, the mobile device 202 sends information indicating a sign to stop the downlink TPC information saving mode to the base station 201 and also terminates the downlink TPC information saving mode of the mobile device 202. Upon receiving this information from the mobile device 202, the base station 201 terminates the downlink TPC information saving mode.

In downlink communication, the base station 201 is a transmission side, the mobile device 202 is a reception side. Accordingly, it is the mobile device 202 that is able to detect the wireless communication qualities of all component carriers. Thus, the mobile device 202 may generate and update the DLCC grouping table 812 (DLCC grouping table 713 of the base station 201).

As discussed above, in this embodiment, the TPC information saving mode is performed in which transmission power is controlled by using one item of TPC information for a plurality of component carriers having similar channel characteristics. Accordingly, by using a common TPC command for a plurality of component carriers having similar channel characteristics, the control overhead may be reduced. It is thus possible to reduce the amount of information for performing TPC and to reduce the load imposed on a control channel. It is also possible to suppress deterioration of the quality of wireless signals of a plurality of component carriers having similar channel characteristics.

Additionally, in this embodiment, individual TPC is performed for each of component carriers which are not grouped. Accordingly, even while the TPC information saving mode is being performed, it is also possible to suppress deterioration of the quality of wireless signals of component carriers which are not grouped.

In this embodiment, a plurality of component carriers which have similar channel characteristics and in which the qualities of wireless signals are stabilized are grouped together, and then, transmission power is controlled by using one item of TPC information for such component carriers. It is thus possible to suppress deterioration of the quality of wireless signals while the TPC information saving mode is being performed.

In this embodiment, a plurality of component carriers having similar channel characteristics and having stabilized transmission power are grouped together, and then, transmission power is controlled by using one item of TPC information for such component carriers. It is thus possible to suppress deterioration of the quality of wireless signals while the TPC information saving mode is being performed.

In this embodiment, grouping of component carriers is performed 0106. Accordingly, component carriers to be grouped may be updated sequentially, thereby making it possible to further suppress deterioration of the quality of wireless signals.

In this embodiment, when the center frequency of a component carrier is a high frequency, the frequency bandwidth (grouping bandwidth) is set to be narrower than that when the center frequency of a component carrier is a low frequency. Thus, even when the center frequency of a component carrier is a high frequency, it is possible to suppress deterioration of the quality of wireless signals.

In this embodiment, when the moving rate of the mobile device 202 is increased, the frequency bandwidth (grouping bandwidth) is set to be narrower. Thus, even when the moving rate of the mobile device 202 is increased, it is possible to suppress deterioration of the quality of wireless signals.

In this embodiment, when the shielding degree of radio waves between the base station 201 and the mobile device 202 is increased, the frequency bandwidth (grouping bandwidth) is set to be narrower. Thus, even when the shielding degree of radio waves is increased, it is possible to suppress deterioration of the quality of wireless signals.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication method for transmitting a plurality of wireless signals using a plurality of carriers from a second wireless communication apparatus to a first wireless communication apparatus, each of the plurality of carriers having each of a plurality of bandwidths, the wireless communication method comprising:

determining, by the first wireless communication apparatus, a carrier group including at least two of the plurality of carriers;

transmitting, by the first wireless communication apparatus, group power control information for controlling a transmission power of the carrier group to the second wireless communication apparatus, the group power control information being generated by the first wireless communication apparatus in accordance with a reception quality of the carrier group received from the second wireless communication apparatus, the reception quality of the carrier group being obtained based on at least one of the plurality of wireless signals that has a carrier included in the carrier group; and receiving the plurality of wireless signals from the second wireless communication apparatus in accordance with the group power control information; wherein the carrier group is determined based on when an accumulation of variations of transmission power in at least two of the plurality of carriers is equal to or smaller than a predetermined amount.

2. The wireless communication method according to claim 1, further comprising:

transmitting, by the first wireless communication apparatus, individual power control information for controlling at least one transmission power individually for at least one carrier that is not included in the carrier group, the individual power control information being generated in accordance with a reception quality of the at least one carrier; and receiving, by the first wireless communication apparatus, the plurality of wireless signals from the second wireless communication apparatus in accordance with the individual power control information.

3. The wireless communication method according to claim 1, wherein the at least two of the plurality of carriers are included in a certain frequency range.

4. The wireless communication method according to claim 3, wherein the carrier group is further determined in accordance with a center frequency of one of the plurality of carriers included in the certain frequency range.

5. The wireless communication method according to claim 3, wherein the certain frequency range is determined in accordance with at least one of moving speeds of the first wireless communication apparatus and the second wireless communication apparatus.

6. The wireless communication method according to claim 1, wherein the carrier group is periodically determined.

7. The wireless communication method according to claim 1, wherein reception quality includes a shielding degree.

8. The wireless communication method according to claim 1, wherein each of the plurality of bandwidths is assigned for a wireless communication channel.

9. A wireless communication apparatus for transmitting a plurality of wireless signals using a plurality of carriers to a different wireless communication apparatus, each of the plurality of carriers having each of a plurality of bandwidths, the wireless communication apparatus comprising:

a memory; and a processor coupled to the memory and configured to determine a carrier group including at least two of the plurality of carriers, transmit group power control information for controlling a transmission power of the carrier group, the group power control information being generated in accordance with a reception quality of the carrier group, the reception quality of the carrier group being obtained based on at least one of the plurality of wireless signals that has a carrier included in the carrier group, and receive the plurality of wireless signals in accordance with the group power control information; wherein the carrier group is determined based on when an accumulation of variations of transmission power in at least two of the plurality of carriers is equal to or smaller than a predetermined amount.

10. A wireless communication apparatus for receiving a plurality of wireless signals using a plurality of carriers from a different wireless communication apparatus, each of the plurality of carriers having each of a plurality of bandwidths, the wireless communication apparatus comprising:

a memory; and a processor coupled to the memory and configured to transmit information on a carrier group including at least two of the plurality of carriers, receive group power control information for controlling a transmission power of the carrier group, the group power control information being generated in accordance with a reception quality of the carrier group, the reception quality of the carrier group being obtained in based on at least one of the plurality of wireless signals that has a carrier included in the carrier group, and receive the plurality of wireless signals in accordance with the group power control information; wherein the carrier group is determined based on when an accumulation of variations of transmission power in at least two of the plurality of carriers is equal to or smaller than a predetermined amount.

* * * * *